US012675037B2

(12) United States Patent
Ji et al.

(10) Patent No.: US 12,675,037 B2
(45) Date of Patent: Jul. 7, 2026

(54) AMBIENT IMAGE PROJECTION DEVICE

(71) Applicants:ZHONGSHAN YONGQI ELECTRONIC TECHNOLOGY CO., LTD., Zhongshan (CN); ZHONGSHAN BOLONG ELECTRONIC TECHNOLOGY CO., LTD., Zhongshan (CN); ZHONGSHAN JIAEN OPTOELECTRONICS CO., LTD., Zhongshan (CN)

(72) Inventors: Shaoqi Ji, Zhongshan (CN); Kexian Liu, Zhongshan (CN); Bo Li, Zhongshan (CN); Yong Huang, Zhongshan (CN); Gang Wang, Zhongshan (CN); Jing Li, Zhongshan (CN)

(73) Assignee: ZHONGSHAN JIAEN OPTOELECTRONICS CO., LTD., Zhongshan (CN)

( * ) Notice: Subject to any disclaimer, the term of this patent is extended or adjusted under 35 U.S.C. 154(b) by 0 days.

(21) Appl. No.: 19/358,841

(22) Filed: Oct. 15, 2025

(65) Prior Publication Data

US 2026/0036894 A1     Feb. 5, 2026

Related U.S. Application Data

(63) Continuation-in-part of application No. 18/562,333, filed as application No. PCT/CN2022/098282 on Jun. 11, 2022, now Pat. No. 12,498,632.

(30) Foreign Application Priority Data

Jan. 19, 2022    (CN) ......................... 202210061417.3

(51) Int. Cl.
*G03B 21/20* (2006.01)
*G03B 21/14* (2006.01)
(Continued)

(52) U.S. Cl.
CPC ......... *G03B 21/208* (2013.01); *G03B 21/145* (2013.01); *G03B 21/16* (2013.01); *G03B 21/22* (2013.01); *G03B 21/28* (2013.01)

(58) Field of Classification Search
None
See application file for complete search history.

(56) References Cited

U.S. PATENT DOCUMENTS 5,829,858 A * 11/1998 Levis ................... H04N 9/3152
                                                            353/122
2005/0219474 A1* 10/2005 Hara ................... G03B 21/2053
                                                              353/88
(Continued)

FOREIGN PATENT DOCUMENTS

CN          110727163 A  *  1/2020  ............. G03B 21/28
JP          2006171268 A  *  6/2006

*Primary Examiner* — Bao-Luan Q Le
*Assistant Examiner* — Danell L Owens
(74) *Attorney, Agent, or Firm* — HOWARD M COHN and Associates, LLC

(57)          ABSTRACT

An ambient image projection device includes a lens assembly and a projection assembly. The projection assembly includes a first light source and a display screen. Content displayed on the display screen forms dynamic images to be projected into space under guidance of the lens assembly. The first light source, the display screen, and the lens assembly are arranged along an optical path direction of the projection assembly. The display screen is arranged on a light-emitting side of the first light source and is coaxially arranged with the first light source.

18 Claims, 33 Drawing Sheets

(51)  Int. Cl.
    *G03B 21/16*        (2006.01)
    *G03B 21/22*        (2006.01)
    *G03B 21/28*        (2006.01)

(56)           References Cited

U.S. PATENT DOCUMENTS

2006/0170885 A1 * 8/2006 Kitahara ................ G03B 21/16
                                         353/119
2012/0147338 A1 * 6/2012 Huang ................... G02B 13/08
                                         353/101

* cited by examiner

5  Speaker

21  Display screen          controller  6

1  First light source

Ambient image projection device 801 (801a)

802

801b

72

71

AMBIENT IMAGE PROJECTION DEVICE

CROSS-REFERENCE TO RELATED APPLICATIONS

The present disclosure is a continuation in part of a pending non-provisional application Ser. No. 18/562,333 filed on Nov. 20, 2023, which is a national stage of an international application No. PCT/CN2022/098282 filed on Jun. 11, 2022, which claims a priority to Chinese Patent Application No. 202210061417.3 filed on Jan. 19, 2022. The contents of above applications are incorporated herein by reference in their entireties.

FIELD

The subject matter herein generally relates to projection lamps, and particularly to an ambient image projection device.

BACKGROUND

An ambient lamp is a type of lighting device capable of projecting patterns onto walls, floors, or screens. These lamps are commonly used in stage entertainment settings such as theaters, studios, bars, and discos, where they can project monochromatic or multicolored patterns like water waves, starry skies, or various lines, thereby creating a warm, romantic, and immersive ambiance.

With continuous progress and development of society, people's living standards have steadily improved, and ambient lamps have gradually found their way into countless households. Traditional ambient image projection devices typically rely on a light source passing through a decorative cover printed with patterns to achieve pattern projection. To enhance projection effects, some existing ambient lamps incorporate one or more rotating water ripple discs relative to the light source, allowing light to pass through a focusing lens before projecting images. This approach creates diverse effects such as flowing galaxies or undulating water waves.

For example, U.S. Pat. No. 8,057,045B2 discloses a projection method and device that uses a motor-driven interference wheel to achieve dynamic starry sky and cloud transformation effects. Chinese Patent No. CN207796894U reveals a water ripple projection lamp that utilizes multiple focusing layers of water ripple glass shading cloth and axial reciprocating motion to produce water ripple projection effects. Similarly, Chinese Patent No. CN210891354U introduces a three-in-one starry sky lamp structure that achieves dynamic projections of stars, moons, and clouds through a combination of water ripple discs and projection devices.

In these existing technical solutions, use of motors and interference discs enables dynamic projection effects. However, the projected images exhibit periodic changes, which may lead to aesthetic fatigue over prolonged viewing. To address this problem, a static image projection can be superimposed onto the dynamic interference imagery as a background, creating a more three-dimensional visual effect. Nevertheless, such ambient lamps typically rely on slide-based presentations, often requiring manual image switching—a cumbersome process. Additionally, images are usually projected using film slides; while more slides offer greater scene variety, they also increase costs.

Furthermore, an optical path structure of projection devices significantly impacts projection quality of ambient images.

SUMMARY

In order to solve above deficiencies in existing technologies, the present disclosure aims to provide an ambient image projection device.

An ambient image projection device provided by the present disclosure includes a lens assembly and a projection assembly. The projection assembly includes a first light source and a display screen. Content displayed on the display screen forms dynamic images to be projected into space under guidance of the lens assembly. The first light source, the display screen, and the lens assembly are arranged along an optical path direction of the projection assembly. The display screen is arranged on a light-emitting side of the first light source and is coaxially arranged with the first light source.

Comparing with ambient image projection devices in existing technologies, the present disclosure projects images via a display screen, eliminating the need for a film and thus reducing costs. Moreover, the display screen can offer a more diverse and abundant range of image options, with seamless image switching and convenient operation, significantly enhancing the user experience.

DETAILED DESCRIPTION

The inventors of the present disclosure have discovered that in existing technical solutions, motors are universally employed to drive rotation of light-transmitting structures, thereby achieving motion changes in projected images. However, the projected images exhibit periodic variations, which may lead to aesthetic fatigue over long-time viewing. Additionally, the methods for switching projected images are rigid, making it difficult to create relatively impactful scenes.

In light of this, the present disclosure provides an ambient image projection device capable of rendering more realistic and diverse dynamic scenes to enhance user experience.

Embodiment 1

Figure 1:
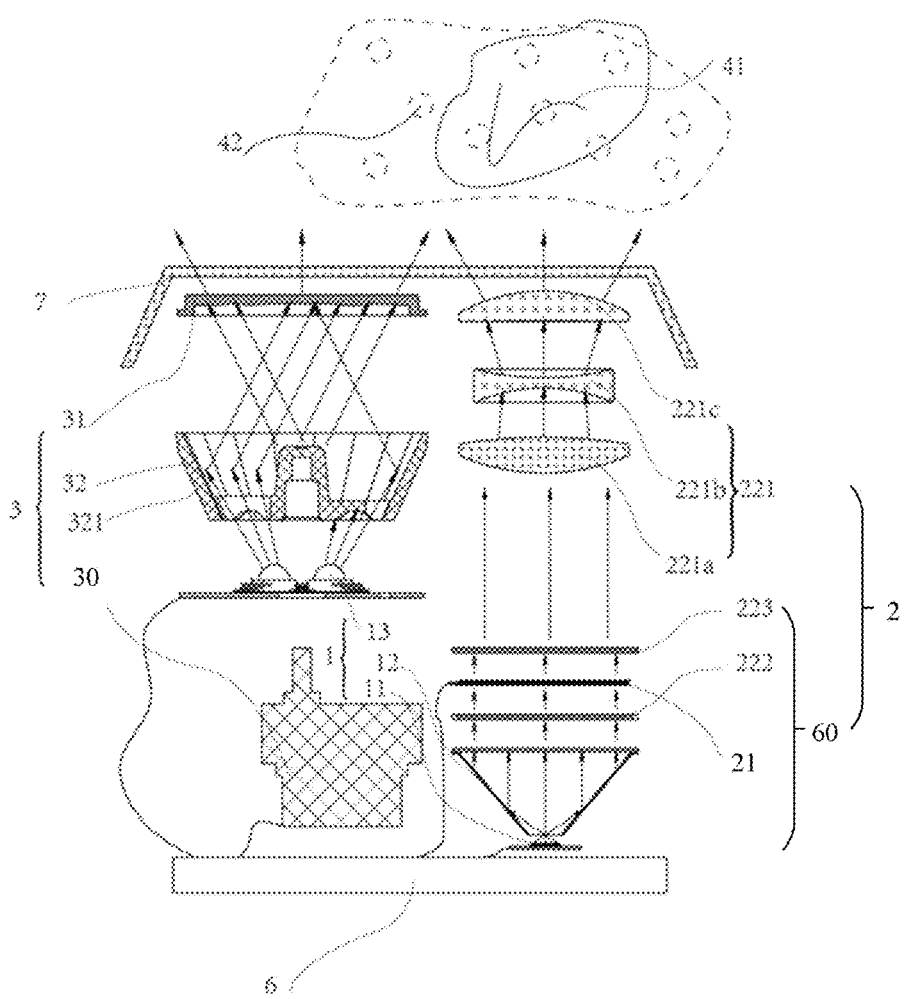
FIG. 1 is a schematic structural diagram of an ambient image projection device a first embodiment of the present disclosure.

The first embodiment of the present disclosure provides an ambient image projection device. As illustrated in FIG. 1, the ambient image projection device includes: a first projection mechanism 2 and a second projection mechanism 3 arranged in parallel with the first projection mechanism 2.

The first projection mechanism 2 includes: a projection assembly 60 and a lens assembly 221. The projection assembly 60 includes a first light source 11 and a display screen 21. The content displayed on the display screen 21 forms dynamic images 41 under guidance of the lens assembly 221 and projects the dynamic images 41 into space.

The second projection mechanism 3 includes: a second light source 13, an interference lens 31, and an optical path module 32. Light emitted from the second light source 13 passes through the interference lens 31 under the guidance of the optical path module 32, forming interference patterns 42 that are projected into space.

The interference patterns 42 and the dynamic images 41 at least partially overlap in space.

The content displayed on the display screen 21 forms dynamic images 41 projected into space, while light from the second light source 13 passes through the interference lens 31 to create the interference patterns 42 projected into space. The interference patterns 42 (indicated by dashed lines in FIG. 1) and the dynamic images 41 at least partially overlap in space. The interference patterns cover a large area, thus providing a more expansive dynamic visual experience. By projecting images via the display screen 21, the need for film slides is eliminated, reducing costs. Furthermore, the display screen 21 offers a richer variety of image options with seamless switching and convenient operation. Compared to existing technologies, this embodiment uses the combination of the interference patterns 42 and the dynamic images 41 to address limitations of narrow visual coverage in dynamic images 41 and monotony caused by limited variations in interference patterns 42. The complementary integration of the dynamic images 41 and the interference patterns 42 significantly enhances user experience.

In the embodiment, the display screen 21 can be a liquid crystal display (LCD) screen, which offers advantages such as low power consumption, compact size, and zero radiation. The light emitted from the first light source 11 can illuminate the display screen 21, serving as a backlight. In another embodiment, the display screen 21 can be a self-emissive display, such as an LED display or an OLED display, as long as it is capable of forming dynamically displayed content.

The projection assembly 60 may further include a plurality of lenses and a light-converging member 12. The first light source 11, the light-converging member 12, the display screen 21, and the lens assembly 221 are sequentially positioned along an optical path defined by first projection mechanism 2. The plurality of optical lenses arranged among components of the projection assembly 60. The cooperation of the lens assembly 221, the plurality of optical lenses, and the light-converging member 12 enables the projected dynamic images 41 to be clearer and more efficient in light output.

To enhance imaging clarity, the plurality of optical lenses can be convex lenses that can converge light. However, if ordinary convex lenses are employed, since light refraction occurs only at an interface between media and convex lenses are relatively thick, light attenuation may occur during light transmitting, leading to dimming and blurring at edges. Therefore, in the embodiment, Fresnel lenses can be used as the optical lenses. One surface of a Fresnel lens is smooth, while the other surface is etched with concentric circles of increasing sizes. Its texture is designed based on principles of light interference, diffraction, as well as requirements for relative sensitivity and reception angles. Consequently, Fresnel lenses eliminate the need for straight-line light propagation and retain only curved surfaces where refraction occurs, significantly reducing material usage while achieving the same light-converging effect as convex lenses. In other words, Fresnel lenses offer much lower costs compared to ordinary convex lenses.

The plurality of lenses include: a first lens 222 arranged between the light-converging member 12 and the display screen 21; a second lens 223 arranged between the display screen 21 and the lens assembly 221. The lens assembly 221 may include: a first convex lens 221*a*, a first concave lens 221*b*, and a second convex lens 221*c* arranged sequentially, with the first convex lens 221*a* positioned adjacent to the display screen 21.

The first lens 222 and the second lens 223 are designed to better converge light and prevent wastage of light energy. The first convex lens 221*a* converges light, while the first concave lens 221*b* diverges light. Therefore, by designing the parameters of the first convex lens 221*a* and the first concave lens 221*b*, the projection effect of the images, such as the size of the image and its distance, the focusing range, and image quality, can be well ensured. In this embodiment, the second convex lens 221*c* can be a fisheye lens, which, as a wide-angle lens, enables the lens to achieve a maximum photographic viewing angle. Thus, it can project a larger space within confined environment of the ambient image projection device, improving spatial utilization of the device.

Figure 2:
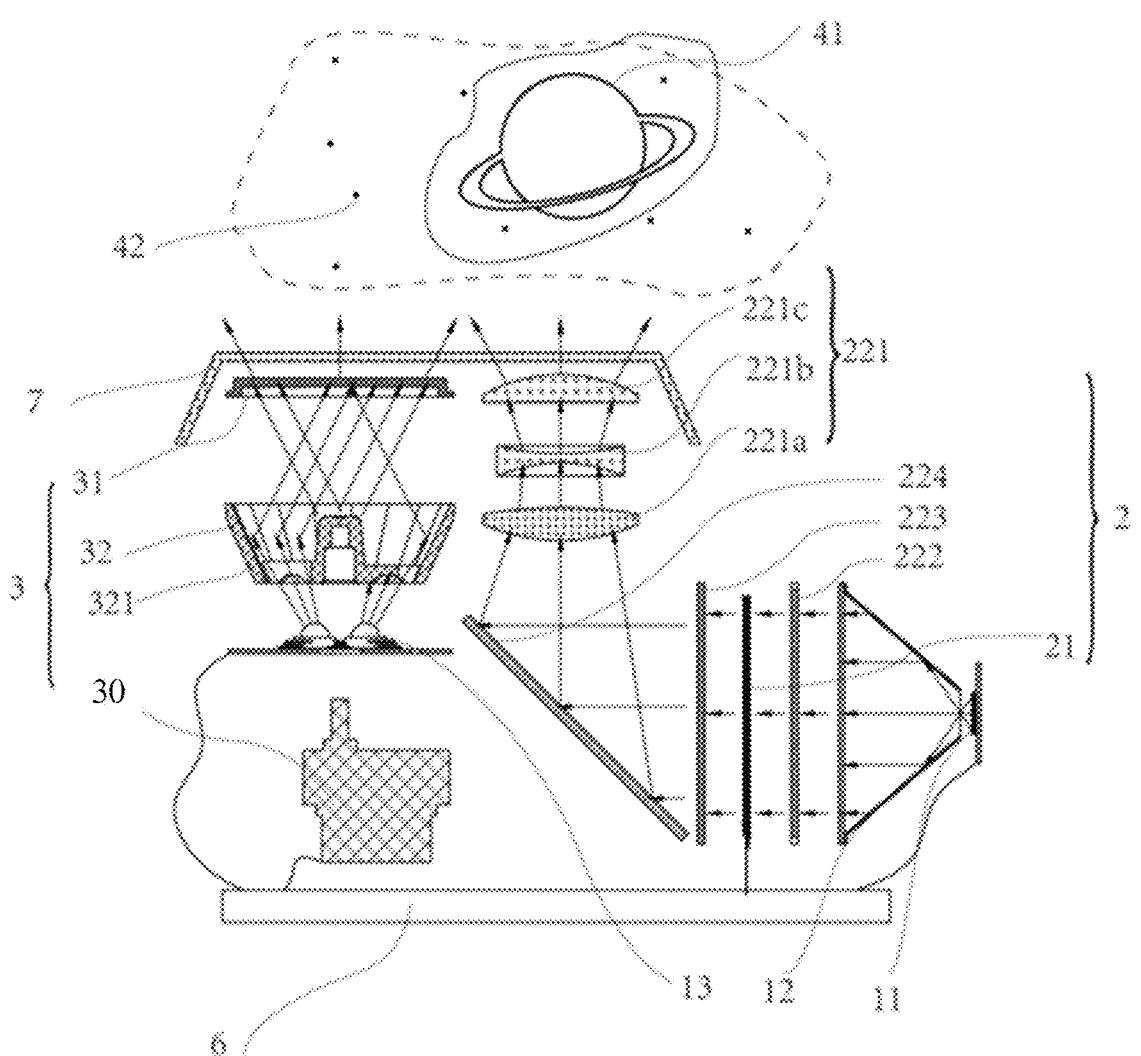
FIG. 2 is a schematic structural diagram of an ambient image projection device a second embodiment of the present disclosure.

In another embodiment, as shown in FIG. 2, the projection assembly 60 may further include a reflective mirror 224 positioned between the second lens 223 and the lens assembly 221. The reflective mirror 224 is arranged at an angle to the display screen 21. When the reflective mirror 224 is positioned at an angle to the display screen 21, it can alter a direction of light propagation, enabling light emitted from the second lens 223 to be reflected by the reflective mirror 224 and then incident onto the lens assembly 221. Optionally, the reflective mirror 224 may be set at a 45° angle to the display screen 21, causing the light emitted from the second lens 223 to be perpendicular to the light incident onto the optical lens 221.

By comparing FIGS. 1 and 2, it can be observed that if the optical lenses and the reflective mirror 224 are of the same size, dimensions of components such as the lens assembly 221 in the embodiment shown in FIG. 2 can be relatively smaller. Similarly, if the dimensions of components like the lens assembly 221 in the embodiment are the same with that in the embodiment in FIG. 1, the sizes of the lenses and the reflective mirror 224 in the embodiment can be smaller than that in the embodiment in FIG. 1. In other words, due to incorporation of the reflective mirror 224, this embodiment further enhances the spatial utilization efficiency of the ambient image projection device.

The second optical path module 32 may include: a reflective cup 321 positioned between the light source assembly 1 and the interference lens 31. A reflective surface on an inner wall of the reflective cup 321 consists of a plurality of light-reflective planes. Light incident onto the reflective surface can be reflected off these multiple planes, creating numerous intersecting light rays. Thus, the reflective cup 321 can guide the light emitted from the light source assembly 1 to the interference lens 31, resulting in clearer projected interference patterns 42 with an improved light output efficiency.

As is well understood by those skilled in the art, in physics, interference occurs when two or more waves overlap in space, leading to superposition or cancellation to form new waveforms. For example, when a monochromatic light beam is split into two beams using a beam splitter and then allowed to overlap in a certain region of space, it is observed that the light intensity in the overlapping region is not uniformly distributed. The brightness varies with positions in space. The brightest areas exceeding a sum of intensities of the original two beams, while the darkest areas may have zero intensity. This redistribution of light intensity is referred to as "interference fringes."

The interference lens 31 can be a transparent water-ripple sheet or a light-transmissive, refractive sheet structure having a water-ripple pattern. Its material can be glass, resin, PC, etc., and a specific choice does not impose any limitations on the present disclosure. Due to an uneven surface of the interference lens 31, optical path differences of refracted light rays vary, causing coherent light rays to superimpose and resulting in alternating bright and dark interference fringes.

In the embodiment, the interference lens 31 or the reflective cup 321 can be rotated 360° by a motor 30 to project dynamic interference patterns 42 in space, achieving effects such as flowing stars or rippling water, thereby enhancing the user experience. For example, the motor 30 can drive rotation of the interference lens 31 while the reflective cup 321 remains stationary, or vice versa, the motor 30 can drive rotation of the reflective cup 321 while the interference lens 31 remains stationary.

The light source assembly 1 may further include a plurality of second light sources 13 configured to correspondingly emit light into the reflective cup 321. Light emitted from the plurality of second light sources 13 enters the reflective cup 321 and then passes through the interference lens 31 to produce distinct interference patterns 42. These second light sources 13 can be sequentially turned on and off to project dynamic interference patterns 42 in space. The second light sources 13 of different colors and intensities can introduce more variations in the projected interference patterns 42, improving the projection effects of the ambient image projection device.

The second light source 13 employed in the present disclosure can be either a monochromatic light source or an RGB light source, namely a multicolored light source. The first light source 11 used in the present disclosure preferably emits white light. Compared to light sources of other colors, white light does not affect warm or cool tones of the image colors when projected onto the display screen 21, enabling a more accurate representation of the image colors.

Figure 3:
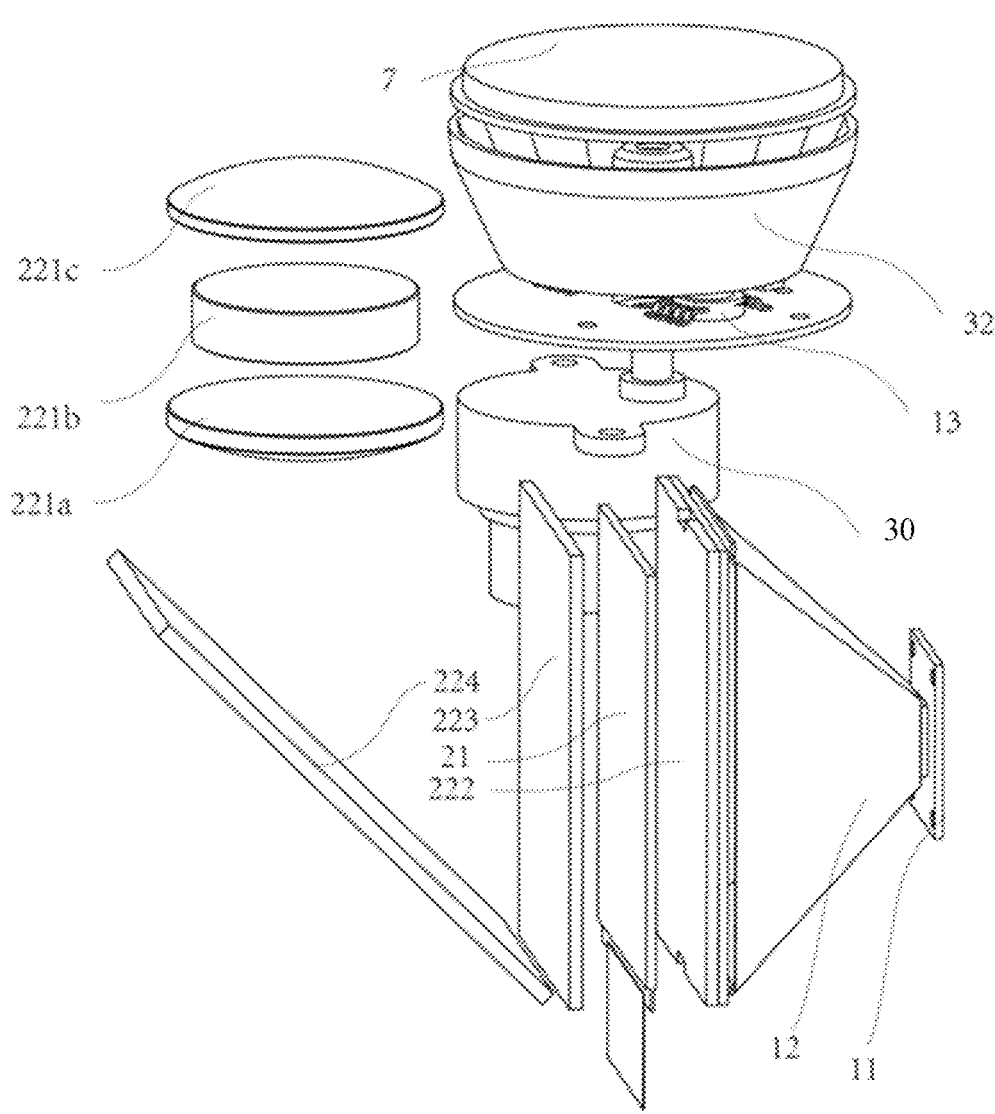
FIG. 3 is a schematic structural diagram of an ambient image projection device a third embodiment of the present disclosure.

In the embodiment, as shown in FIGS. 2 and 3, the light emitted by the monochromatic or multicolored second light source 13 is reflected by the reflective cup 321. The reflective cup 321 can be fixed to the motor 30 using three reinforcing ribs, which allows the reflected light to rotate along with the motor 30 and project patterns onto the interference lens 31 with striped or uneven surfaces.

The light emitted by the first light source 11 is collected by the light-converging member 12 and then projected onto the first lens 222, which redirects it onto the liquid crystal display screen 21 as backlight. The content on the display screen 21 undergoes a first 3D conversion via the second lens 223, followed by a second conversion through the first convex lens 221a and the first concave lens 221b, and is finally imaged through the second convex lens 221c.

The images projected by the second projection mechanism 3 and the first projection mechanism 2 undergo refraction through an irregular dust-proof and light-transmissive cover 7, and finally form dynamic images 41 and interference patterns 42 projected into space. For example, the interference pattern 42 may appear as a rotating night sky, while the dynamic image 41 could be a rotating Saturn. The interference pattern 42 and dynamic image 41 at least partially overlap in space, resulting in a dynamic image with Saturn as the foreground and the night sky as the background. Therefore, this embodiment provides the ambient image projection device with a wide-angle view and a stereoscopic effect, smooth image playback, diverse image selection, a compact structure, and low cost, thus significantly enhancing the user experience.

It is worth mentioning that the first projection mechanism 2 and the second projection mechanism 3 of the ambient image projection device in this embodiment can be used independently or in combination according to user needs.

Embodiment 2

The second embodiment of the present disclosure proposes an ambient image projection device, which differs from the first embodiment primarily in that: in the first embodiment, the first projection mechanism 2 and the second projection mechanism 3 are connected to separate light sources, whereas in the second embodiment, they are connected to the same light source.

Figure 4:
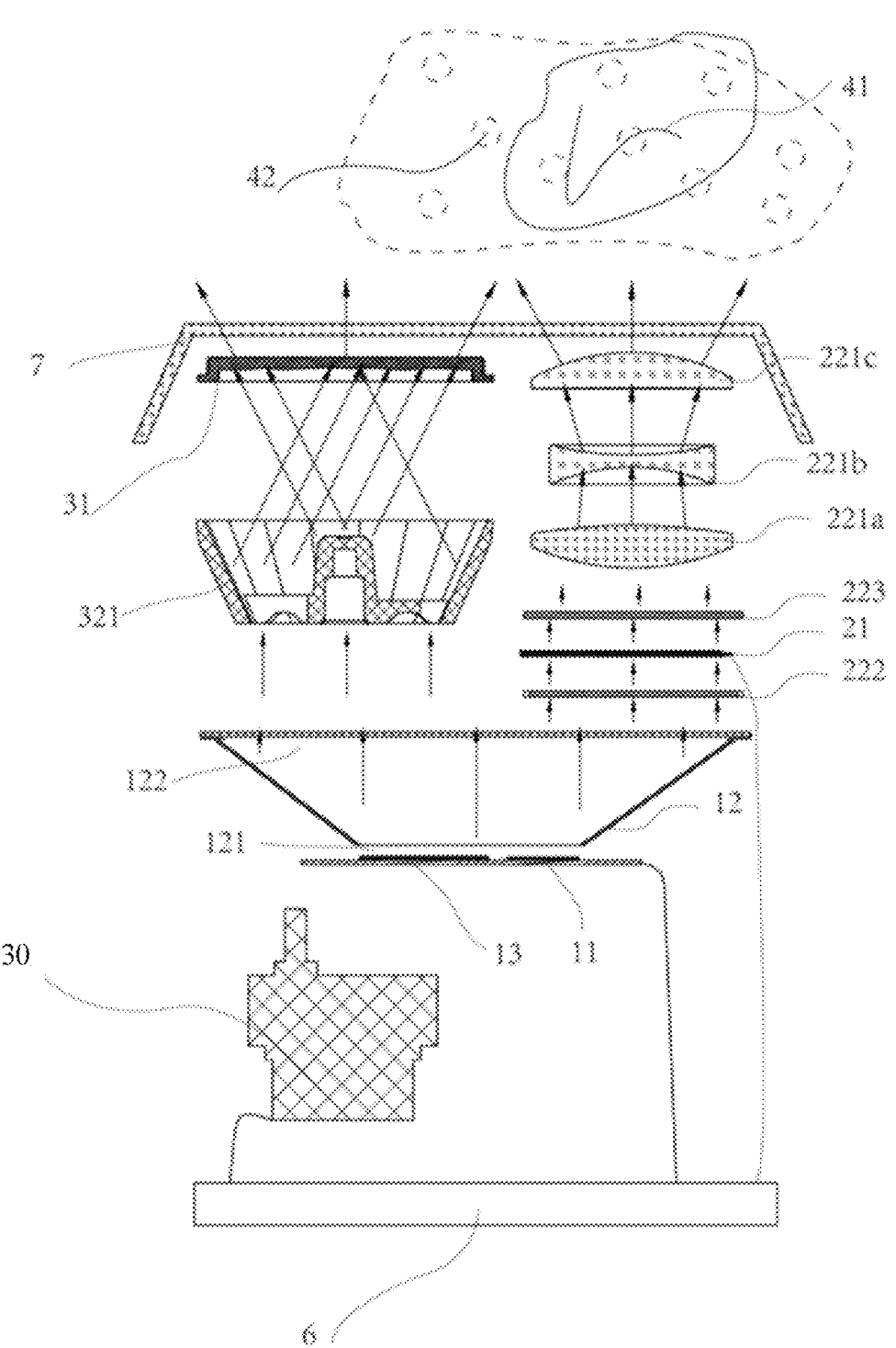
FIG. 4 is a schematic structural diagram of an ambient image projection device a fourth embodiment of the present disclosure.

Specifically, as shown in FIG. 4, the light-converging member 12 includes a light entrance 121 and a light exit 122. Both the display screen 21 and the reflective cup 321 are arranged at the exit of the light-converging member 12.

The light emitted by both the first light source 11 and the second light source 13 enters the light-converging member 12 through the light entrance 121.

After being collected by the light-converging member 12, part of the light from the first light source 11 and the second light source 13 is reflected by the reflective cup 321 and projects patterns onto the interference lens 31 with striped or uneven surfaces. Another part of the light is projected onto the first lens 222 and redirected onto the liquid crystal display screen 21 as backlight. The content on the display screen 21 undergoes a first 3D conversion via the second lens 223, followed by a second conversion through the first convex lens 221a and the first concave lens 221b, and is finally imaged through the second convex lens 221c. In one embodiment, the first light source 11 and the second light source 13 can be mounted on the motor 30 and rotated under the motor's driving. Alternatively, the first light source 11 and the second light source 13 can be the same light source, providing light for both the reflective cup 321 and the display screen 21.

The images projected by the second projection mechanism 3 and the first projection mechanism 2 undergo refraction through the irregular dust-proof and light-transmissive cover 7, ultimately forming interference patterns 42 and dynamic images 41 projected into space. Compared to the first embodiment, the ambient image projection device in this embodiment has a more compact structure, higher spatial utilization efficiency, and cost savings.

Embodiment 3

Figure 5:
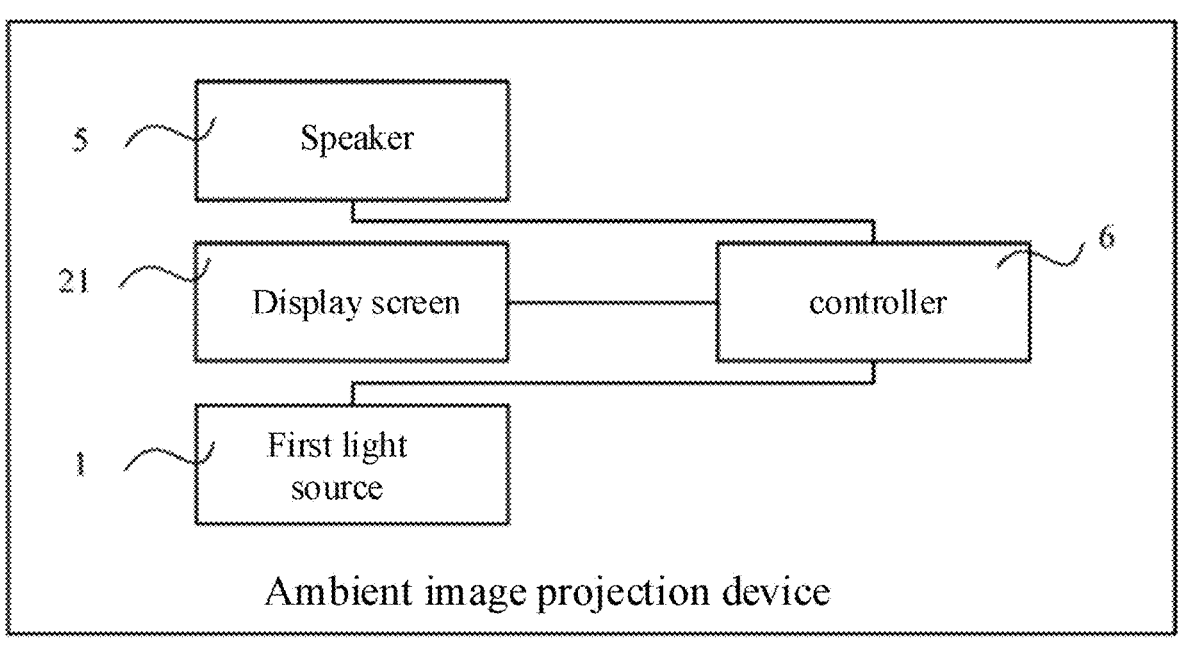
FIG. 5 is a schematic structural diagram of an ambient image projection device a fifth embodiment of the present disclosure.

To provide users with an immersive experience, the inventors of the present disclosure have made optimized designs based on the aforementioned embodiments to further enhance projection effects of the ambient image projection device. As shown in FIG. 5, the ambient image projection device may include a speaker 5 and a controller 6. The controller 6 is in a communication connection with the display screen 21, the speaker 5, and the light source assembly 1, respectively. The controller 6 is configured to provide video signals to the display screen 21 and audio signals to the speaker 5. Additionally, the controller 6 adjusts parameters such as the intensity or frequency of the light emitted by the light source assembly 1 into the second projection mechanism 3 based on a waveform of the audio signals. This embodiment enables the light intensities of the interference pattern 42 and the dynamic image 41 to vary with the music through the controller 6, providing users with a dual sensory experience of sight and sound, which enhances an entertainment value. For instance, when the music is soft, the second light source 13 can dim accordingly; when the music is loud, the second light source 13 can brighten. When the music has a slow rhythm, the second light source 13 can flash at a lower frequency; when the music has a fast rhythm, the second light source 13 can flash at a higher frequency.

In one embodiment, as shown in FUG. 5, the controller 6 can further adjust the color of the light emitted by the light source assembly 1 into the second projection mechanism 3 based on RGB colors of the video signals. The display screen 21 displays a variety of colors, and by analyzing the predominant color, the controller 6 adjusts the color of the light emitted by the light source assembly 1 into the second projection mechanism 3. For example, if the predominant color displayed on the screen 21 is blue, the second light source 13 can be white, yellow, etc., to enhance contrast of the overall projection effect. It is understandable that a higher contrast results in clearer, more striking images with more vivid colors, which is beneficial for improving the user experience.

In this embodiment, the controller 6 can be a single-chip microcomputer integrated on the control circuit board of the light source assembly 1 or can be set up separately. The controller 6 can obtain control signals through a button switch or a wireless signal transceiver to control the intensity of the light in the second projection mechanism 3. Additionally, the control circuit board can rely on a DC power to supply electricity to the light source assembly 1.

Embodiment 4

The present disclosure further provides an ambient image projection method, which includes:

Forming a dynamic image 41 from the content displayed on the display screen 21 under the guidance of the lens assembly 221 and projecting it into space;

Guiding the light emitted by the light source assembly 1 through the second optical path module 32 to form an interference pattern 42 by passing through the interference lens 31 and projecting it into space;

wherein the interference pattern 42 and the dynamic image 41 at least partially overlap in space.

The content displayed on the display screen 21 forms a dynamic image 41 to be projected into space, while the light emitted by the light source assembly 1 forms an interference pattern 42 by passing through the interference lens 31 and the interference pattern 42 is projected into space. Since the interference pattern 42 and the dynamic image 41 at least partially overlap in space, a more three-dimensional visual experience can be achieved. Compared to existing technologies, this embodiment projects images through the display screen 21 without the need for film, resulting in lower costs. Moreover, the display screen 21 can offer a wider variety of image choices with natural image transitions and convenient operation, significantly enhancing the user experience.

In the embodiment, the ambient image projection method may further include:

Providing video signals to the display screen 21 and audio signals to the speaker 5;

Adjusting the intensity or frequency of the light emitted by the light source assembly 1 into the second optical path module 32 based on the waveform of the audio signals;

Adjusting the color of the light emitted by the light source assembly 1 into the second optical path module 32 based on the RGB colors of the video signals.

The light intensities or flashing frequencies of the interference pattern 42 and the dynamic image 41 vary with the music, providing users with a dual sensory experience of sight and sound, and enhancing the entertainment value. This embodiment adjusts the color of the light emitted by the light source assembly 1 into the second projection mechanism 3 by analyzing the predominant color on the display screen 21, thereby improving the contrast between the foreground and background of the overall projection effect. It is understandable that a higher contrast results in clearer, more striking dynamic images 41 in the foreground with more vivid colors, providing a more impactful visual experience.

Embodiment 5

Figure 6:
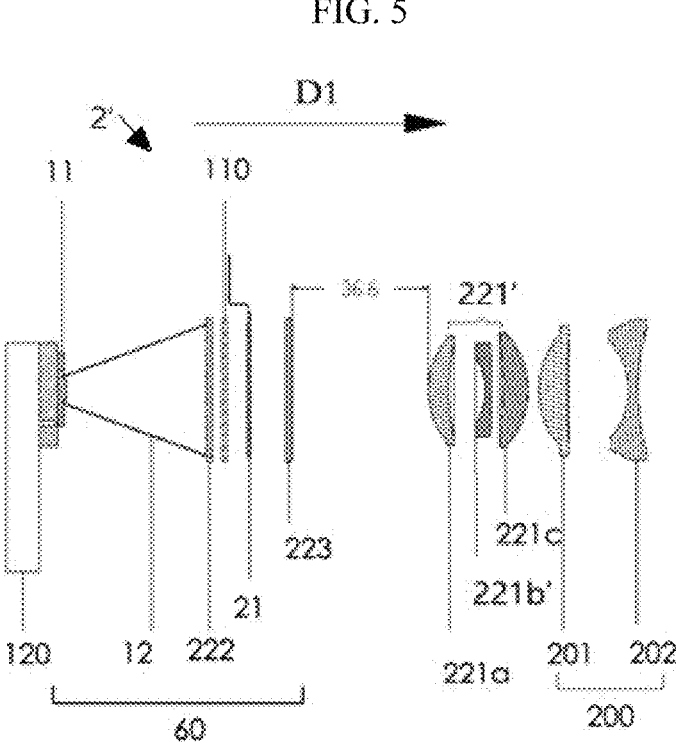
FIG. 6 is a schematic structural diagram showing a basic optical path of the ambient image projection device provided by the fifth embodiment of the present disclosure.

Please refer to FIG. 6. Embodiment 5 of the present disclosure provides an ambient image projection device, which includes the first projection mechanism 2' similar with the first projection mechanism 2 from Embodiment 1 and a distortion lens assembly 200 positioned on a light-emitting side of the first projection mechanism 2'. The distortion lens assembly 200 is designed to receive the image light from the first projection mechanism 2', expand the projection range of the image light, and induce distortion in a portion of the image light at edge regions of the image light from the first projection mechanism 2', thereby generating a projected image with blurred edges.

In the ambient image projection device of this embodiment, after the imaging picture projected by the first projection mechanism 2' passes sequentially through the distortion lens assembly, the picture size can be enlarged while introducing curvilinear distortion at edge regions of the picture. Picture boundaries become blurred, with a sense of boundaries essentially disappearing, resulting in a more aesthetically pleasing and immersive viewing experience. This is particularly effective when displaying ambient scenes such as starry skies, enhancing the sense of immersion and user experience.

Specifically, the first projection mechanism 2' and the distortion lens assembly 200 can be coaxially arranged. In one embodiment, the distortion lens assembly 200 includes a third convex lens 201 and a second concave lens 202. The third convex lens 201 is arranged adjacent to the first projection mechanism 2', while the second concave lens 202 is arranged on a side of the third convex lens 201 opposite to the first projection mechanism 2'.

More specifically, the third convex lens 201 is a plano-convex lens, meaning a first side facing the first projection mechanism 2' is convex, and a second side opposite to the first side is flat. The second concave lens 202 is a biconcave lens, with both sides being concave. It is understandable that a combination of the third convex lens 201 and the second concave lens 202 can achieve favorable edge distortion imaging effects, particularly suitable for displaying ambient scenes such as night skies, starry skies, the universe, and galaxies.

Furthermore, in this embodiment, a concave curvature on the light-receiving side of the second concave lens 202 is greater than that on the light-emitting side. Additionally, a diameter of a projected pattern along an optical axis of the second concave lens 202 on the light-receiving side is smaller than that on the light-emitting side.

A maximum thickness of the third convex lens 201 ranges from 6.2 mm to 10.2 mm. A distance between a center of the concave surface of the second concave lens 202 facing the third convex lens 201 and an optical center of the third convex lens 201 ranges from 11.7 mm to 21.7 mm. It is understandable that by setting these parameter ranges, favorable projection imaging effects can be achieved.

In this embodiment, a total thickness of the third convex lens 201 is 8.2 mm, a diameter of a convex surface of the third convex lens 201 is 30 mm. A distance between the optical center of the third convex lens 201 and a center of its convex surface is 7.5 mm. For the second concave lens 202, a diameter of the concave surface facing the third convex lens 201 is 26 mm and a depth of the concave surface facing the third convex lens 201 is 5.3 mm, while a diameter of a concave surface opposite to the third convex lens 201 is 35 mm and a depth of the concave surface opposite to the third convex lens 201 is 2.6 mm. The distance between the centers of the two concave surfaces of the second concave lens 202 is 2.5 mm. The distance between the center of the concave surface of the second concave lens 202 facing the third convex lens 201 and the optical center of the third convex lens 201 is 16.7 mm.

More specifically, a total thickness of the second concave lens 202 is 10.4 mm. It should be noted that the total thickness of the second concave lens 202 can range from 8.4 mm to 12.4 mm.

Similar to the previous embodiments 1-4, the first projection mechanism 2' includes a projection assembly 60 that is the same with the projection assembly 60 in the embodiments 1~4 and a lens assembly 221' similar to the lens assembly 221 in the embodiments 1-4. The lens assembly 221' of the first projection mechanism 2' includes a first convex lens 221a, a first concave lens 221b', and a second convex lens 221c (also known as a fisheye lens). The convex surface of the first convex lens 221a faces the first light source 11, the concave surface of the first concave lens 221b' faces the flat surface of the first convex lens 221a, and the convex surface of the second convex lens 221c faces the convex surface of the third convex lens 201 in the distortion lens assembly 200. The difference between the first concave lens 221b' in the embodiment and the first concave 221b in above embodiments 1~4 is that the first concave lens 221b' is a plane-concave lens, with its concave surface positioned adjacent to the first convex lens 221a.

In the aforementioned lens group configuration, the imaging picture projected by the projection assembly 60 passes sequentially through the third convex lens 201 and the second concave lens 202 of the distortion lens assembly 200. This allows for the enlargement of the picture size while introducing curvilinear distortion at the picture edges. The distorted picture boundaries become blurred, with the sense of boundary essentially disappearing, creating a starry or night sky effect in dark environments. Ultimately, this achieves a visual effect where the image boundaries are blurred without compromising the clarity of the central image.

Embodiment 6

Figure 7:
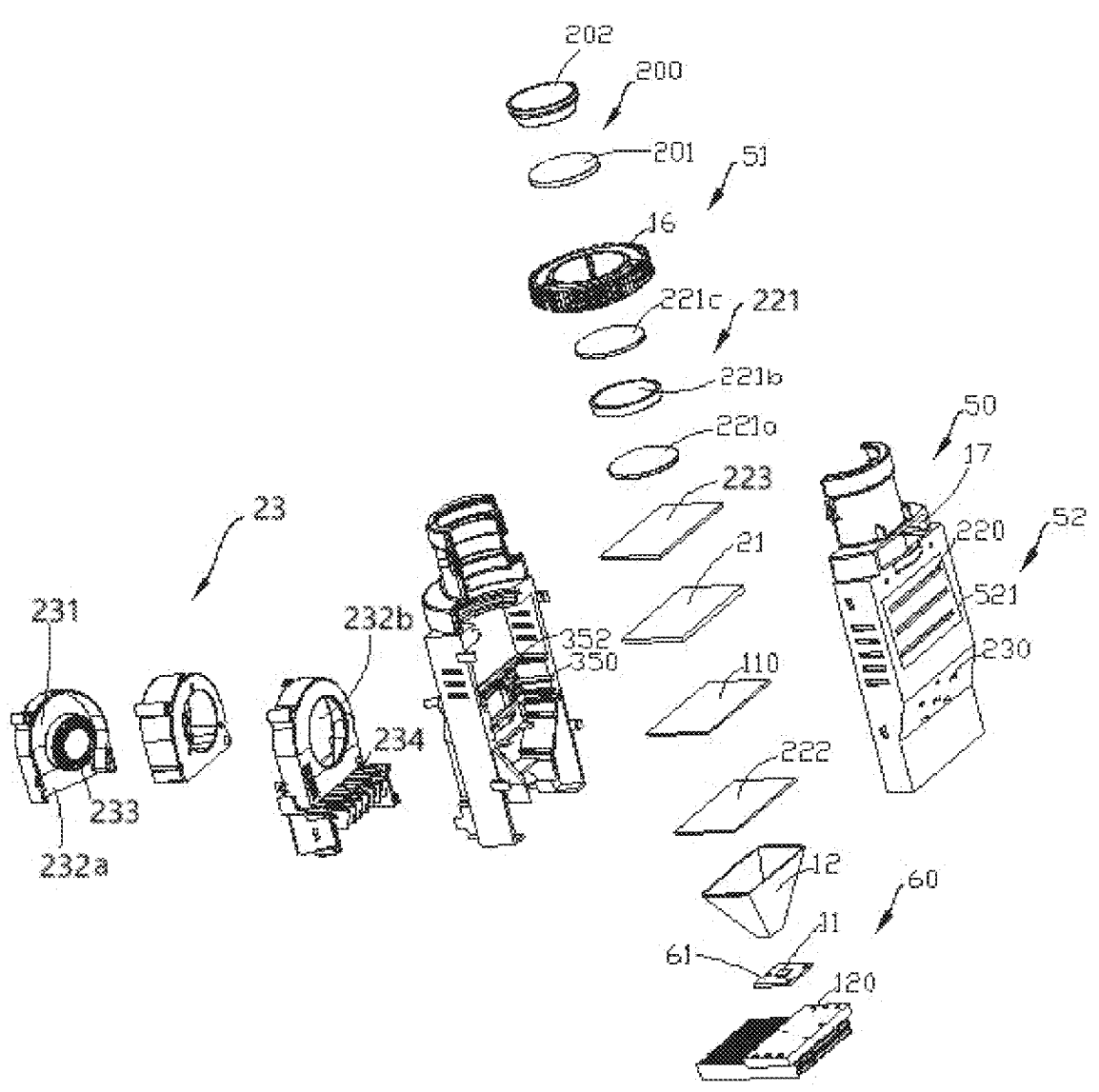
FIG. 7 is an exploded view of an ambient image projection device according to a sixth embodiment of the present disclosure.

Please refer to FIG. 7. Embodiment 6 of the present disclosure provides an ambient image projection device. In addition to including all the components of Embodiment 5 (the first projection mechanism 2' and the distortion lens assembly 200), the ambient image projection device may further include other components such as an optical module housing 50.

Specifically, the first projection mechanism 2' includes, coaxially arranged in sequence along the light-emitting direction, the first light source 11, the light-converging member 12, the first lens 222, the display screen 21, the second lens 223, the lens assembly 221' (which includes the first convex lens 221a, a first concave lens 221b', and the second convex lens 221c), and the distortion lens assembly 200.

The lens assembly 221' is positioned between the distortion lens assembly 200 and the light source assembly 60 (which includes the first light source 11, the light-converging member 12 12, the first lens 222, the display screen 21, and the second lens 223). The lens assembly 221' faces the second lens 223. The first light source 11 is placed at one end of the light-converging member 12, while the first lens 222 is situated at the other end. The first lens 222 and the second lens 223 are positioned on opposite sides of the display screen 21. The lens assembly 221 can also be referred to as a projection lens module. In this embodiment, it includes the first convex lens 221a, the first concave lens 221b', and the second convex lens 221c. However, in other embodiments, the number of lenses can be adjusted as needed.

Figure 8:
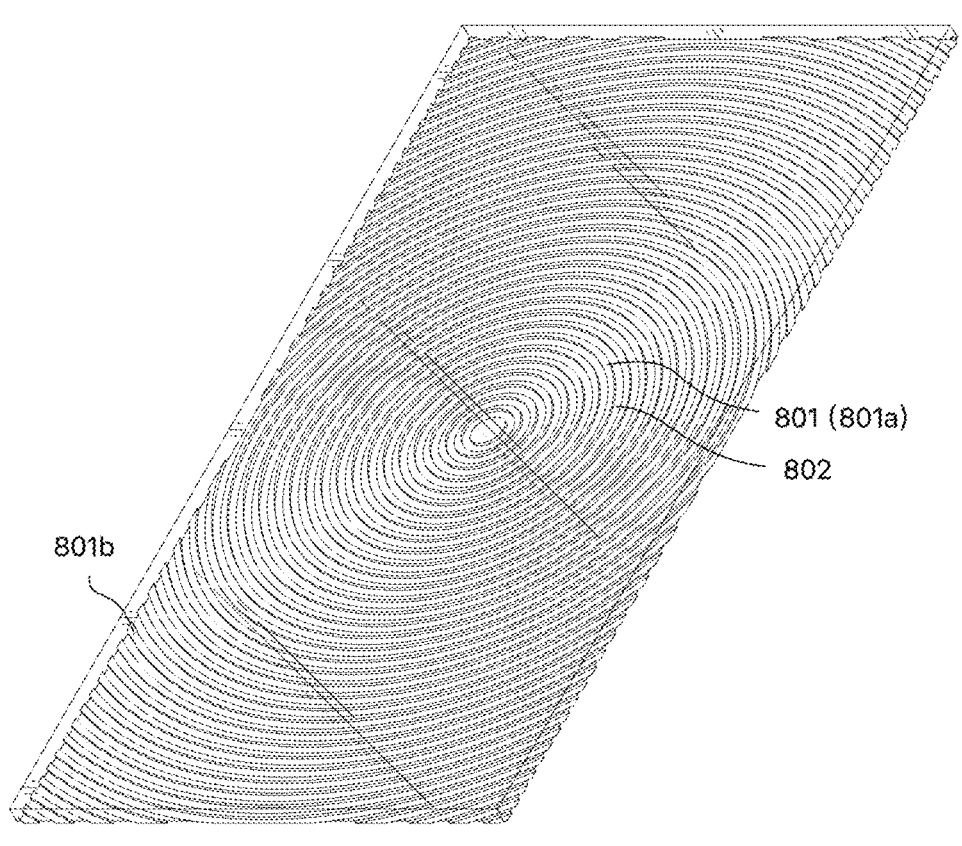
FIG. 8 is a schematic structural diagram of a Fresnel lens used in a projection assembly of the ambient image projection device in the sixth embodiment of the present disclosure.

Specifically, both the first lens 222 and the second lens 223 are Fresnel lenses. As shown in FIG. 8, a Fresnel lens includes a central point and multiple concentric annular protrusions 801 arranged sequentially around it. Between each pair of adjacent annular protrusions 801, an annular groove 802 is formed. It is understandable that a width of the annular protrusions 801 falls within a certain range. The Fresnel lens has a rectangular shape, and the annular protrusions in the central region are complete circular protrusions 801a, while some of the annular protrusions in the peripheral region are divided into two opposing arc-shaped protrusions 801b.

Furthermore, in this embodiment, a heat-insulating glass 110 is placed between the first lens 222 and the display screen 21. It is understandable that the heat-insulating glass 110 can isolate or reduce heat transfer between the display screen 21 and the first light source 11, which is beneficial for improving a service life and an imaging effect of the ambient image projection device. However, in other embodiments, the heat-insulating glass 110 may be omitted.

Additionally, in this embodiment, the distance between the center of the convex surface of the first convex lens 221a in the lens assembly 221' and the surface of the second lens 223 facing the lens assembly 221' ranges from 23 mm to 36.6 mm; specifically, it can be 36.6 mm. It is understandable that by setting the distance between the center of the convex surface of the first convex lens 221a and the surface of the second lens 223 facing the lens assembly 221' within a predetermined range, imaging quality can be ensured, enhancing the user experience.

Figure 9:
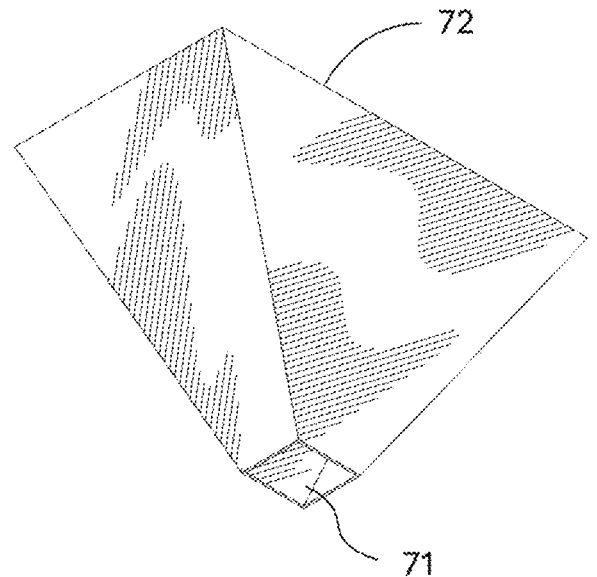
FIG. 9 is a schematic structural diagram of a light-converging member used in the projection assembly of the ambient image projection device in the sixth embodiment of the present disclosure.

As shown in FIG. 9, the light-converging member 12 has a conical structure with a gradually increasing diameter along the optical path direction D1. The light-converging member 12 includes a light inlet 71 and a light outlet 72. A size of a light-emitting area of the first light source 11 is adapted to and corresponds with a size of the light inlet 71, ensuring that substantially all the light emitted by the first light source 11 enters the light-converging member 12 through the light inlet 71, thereby improving light utilization efficiency.

Figure 10:
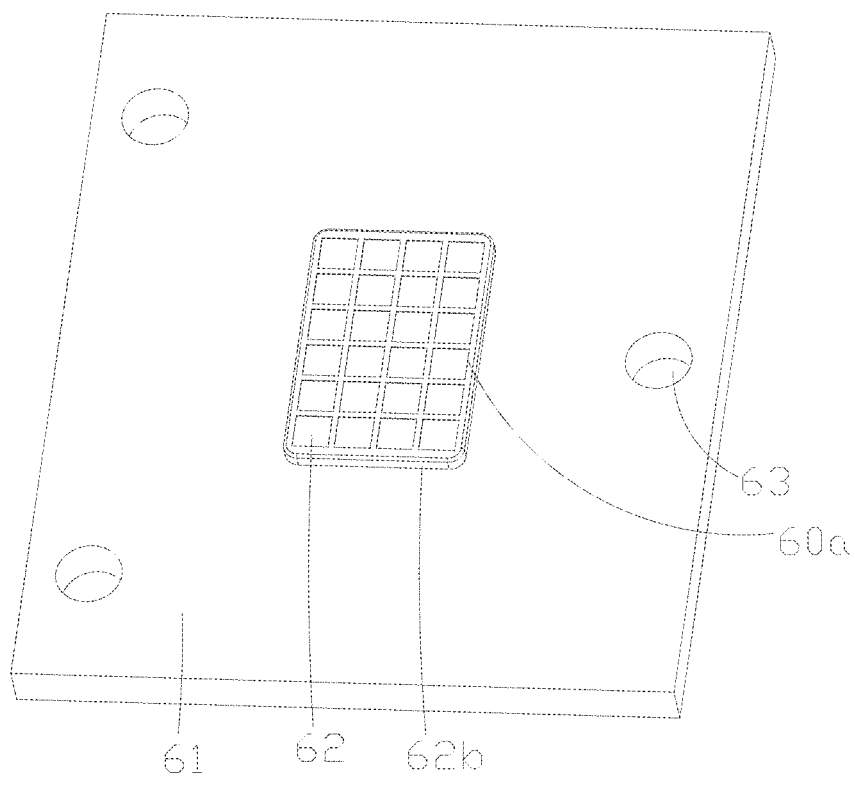
FIG. 10 is a schematic structural diagram of a light source used in the projection assembly of the ambient image projection device in the sixth embodiment of the present disclosure.
Figure 11:
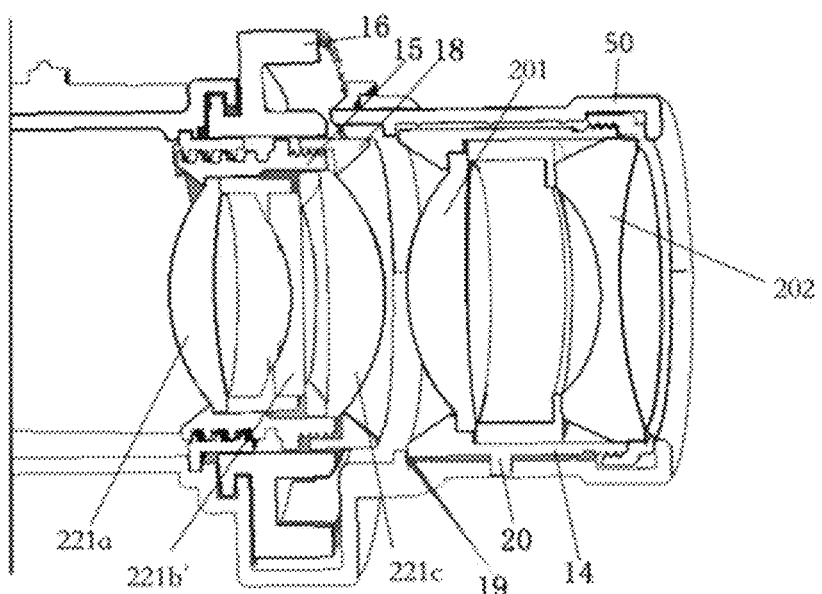
FIG. 11 is a schematic structural diagram showing assembling of a fixed lens barrel and a moveable lens barrel in an optical module housing of the ambient image projection device in the sixth embodiment of the present disclosure.
Figure 12:
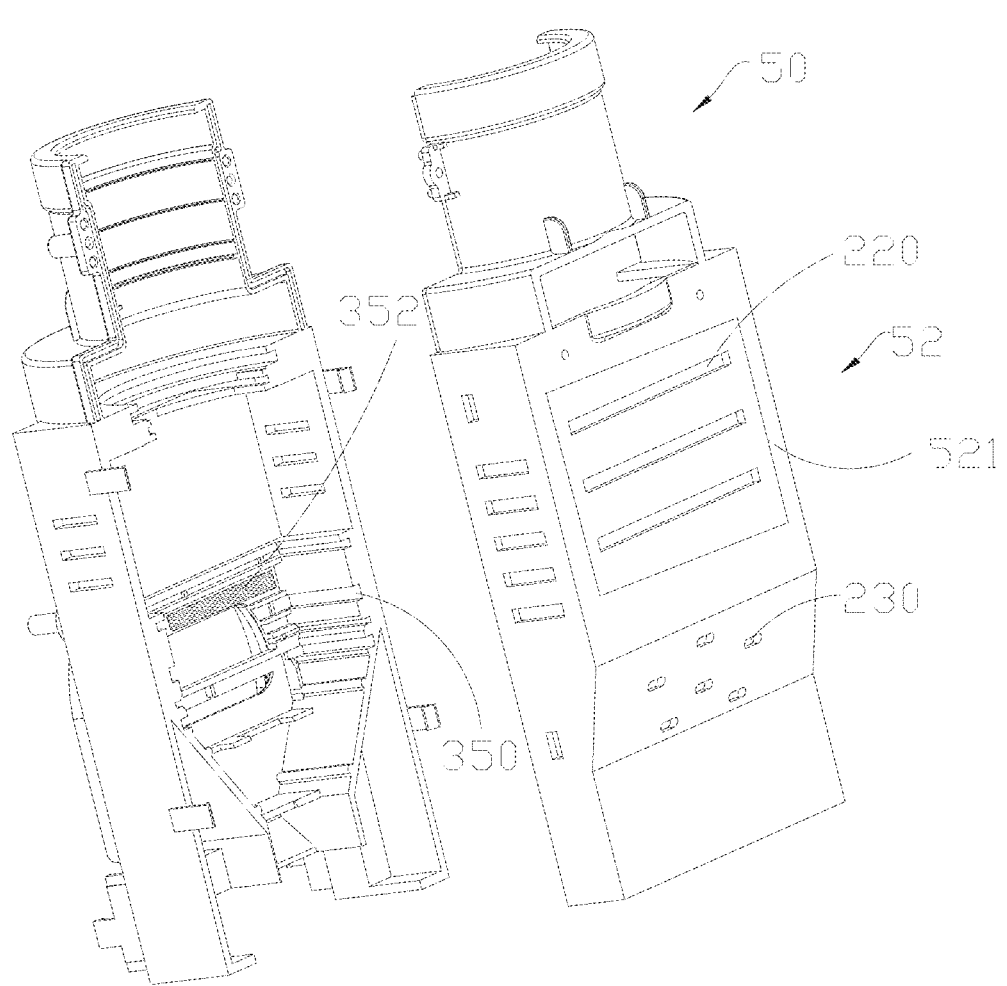
FIG. 12 is a schematic structural diagram of an optical module housing of the ambient image projection device in the sixth embodiment of the present disclosure.
Figure 13:
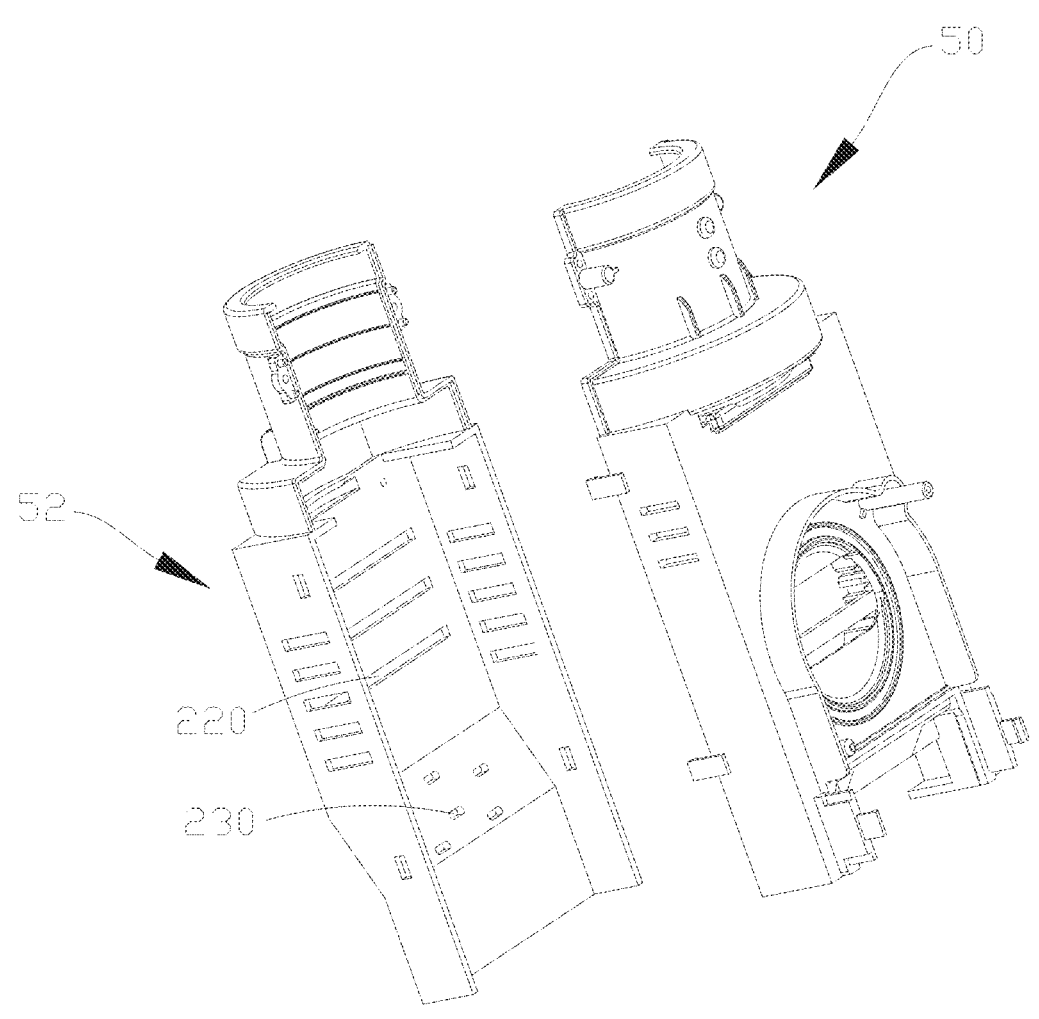
FIG. 13 is a schematic structural diagram of the optical module housing of the ambient image projection device in the sixth embodiment of the present disclosure from another view.
Figure 14:
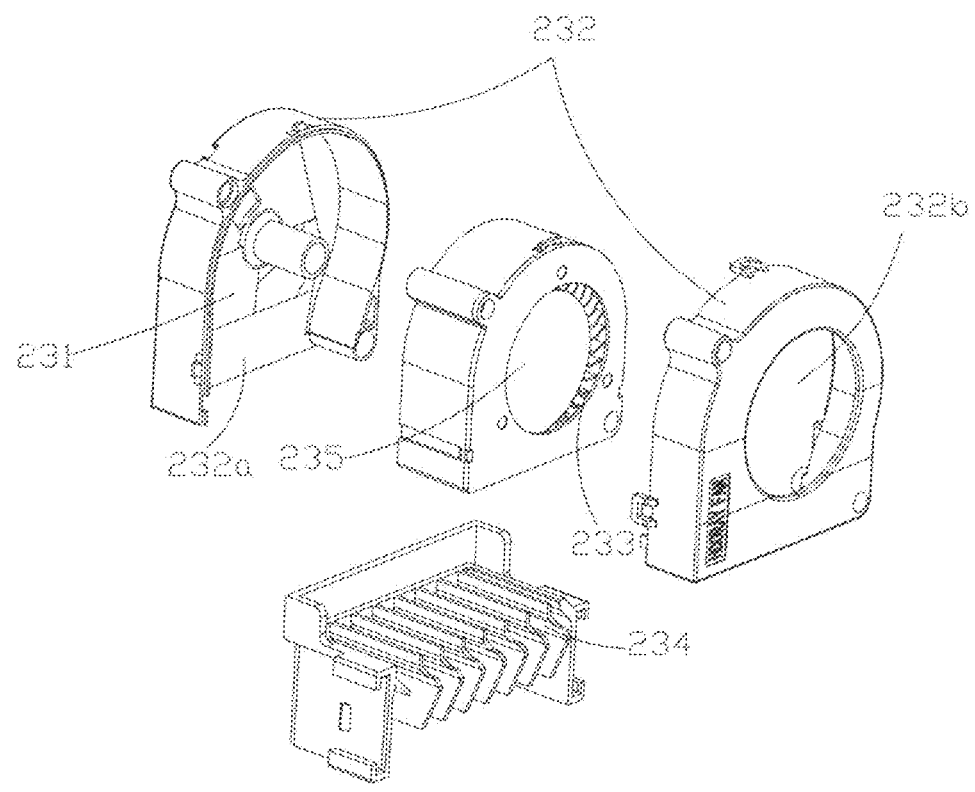
FIG. 14 is an exploded view of a first heat-dissipation fan in the ambient image projection device in the sixth embodiment of the present disclosure.
Figure 15:
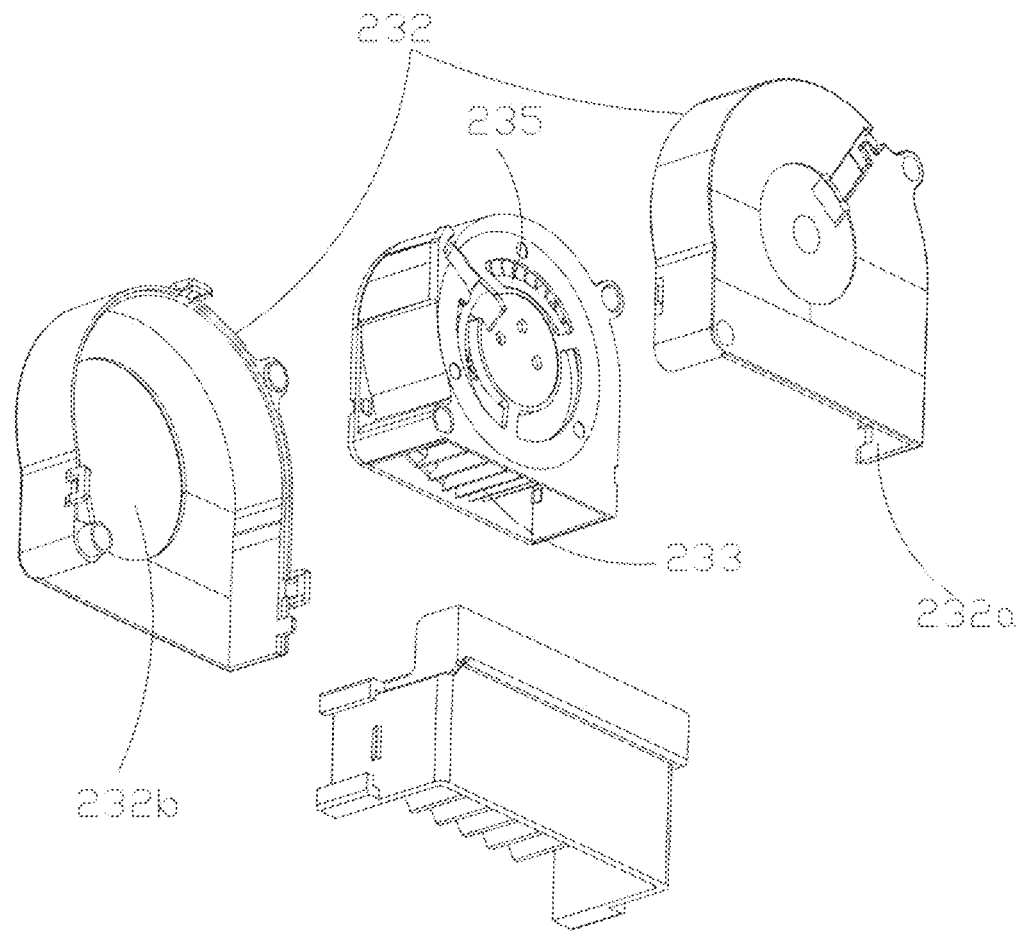
FIG. 15 is an exploded view of the first heat-dissipation fan in the ambient image projection device in the sixth embodiment of the present disclosure from another view.
Figure 16:
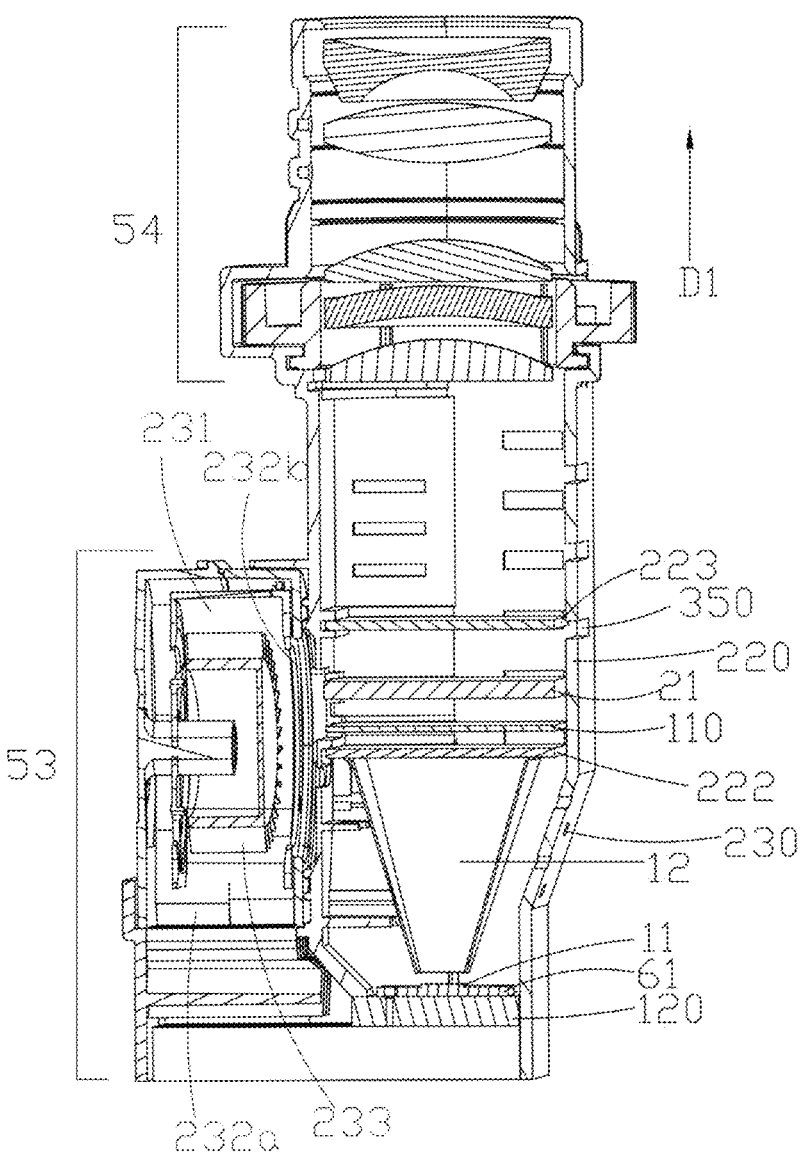
FIG. 16 is a cross-sectional view of the ambient image projection device in the sixth embodiment of the present disclosure.
Figure 17:
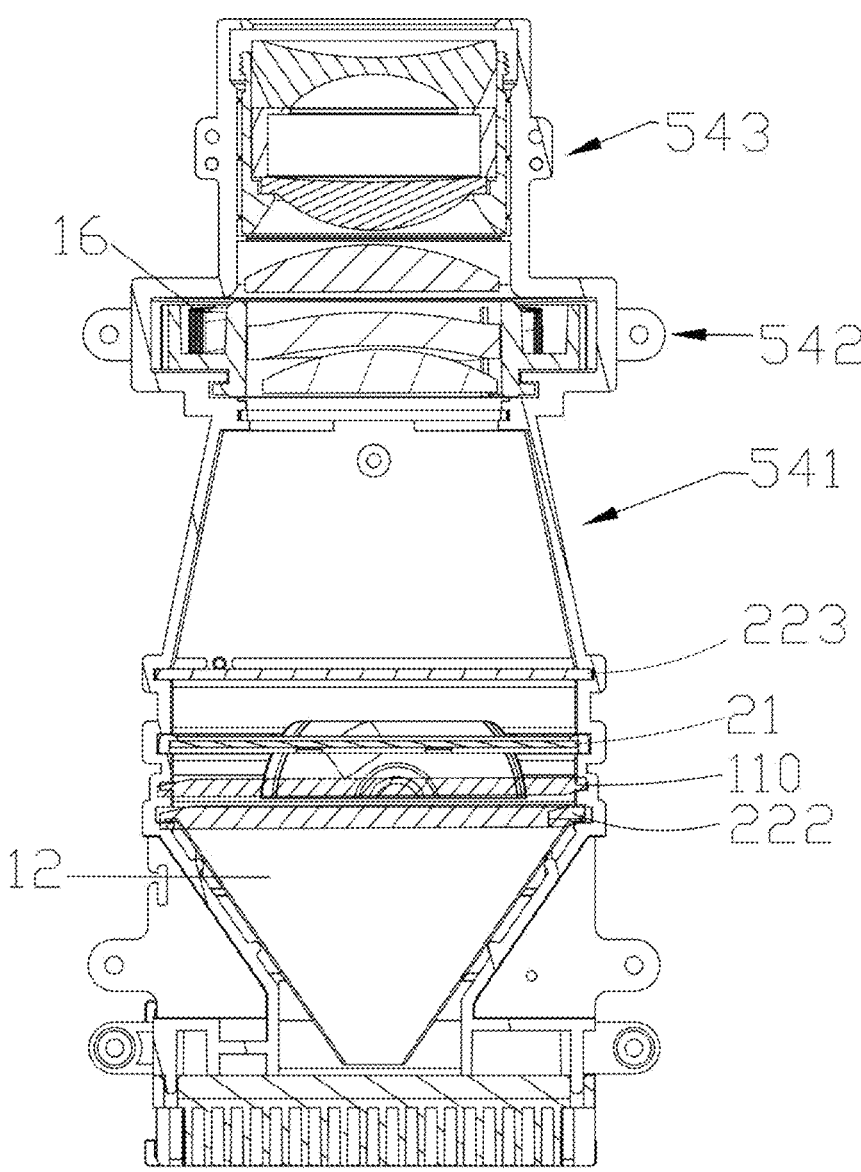
FIG. 17 is a cross-sectional view of the ambient image projection device in the sixth embodiment of the present disclosure from another view.
Figure 18:
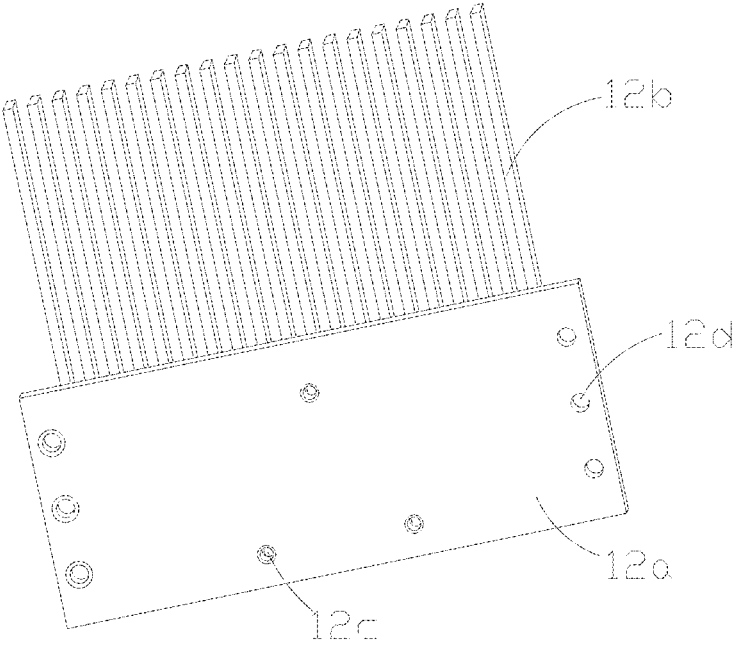
FIG. 18 is a schematic structural diagram of a heat-dissipation member of the ambient image projection device in the sixth embodiment of the present disclosure.

As shown in FIG. 10, the first light source 11 includes a fixed plate 61, a substrate 60b, and a plurality of light-emitting elements 62 arranged on the substrate 60b. The plurality of light-emitting elements 62 enclose a light-emitting area 60a. In this embodiment, a size of the substrate 60b is substantially equal to that of the light-emitting area 60a. The substrate 60b can be positioned inside the light inlet 71 so that the plurality of light-emitting elements 62 are located within the light-converging member 12. In this embodiment, the plurality of light-emitting elements 62 are arranged in a matrix pattern, such as a 4×6 matrix. The fixed plate 61 defines multiple first fixing holes 63 for securing it to other components (e.g., the heat-dissipation member 120). These multiple fixing holes 63 are arranged in a triangular pattern to achieve a more stable fixing effect. In some other embodiments, the size, length, and width of the matrix formed by the plurality of light-emitting elements 62 can be adjusted according to actual needs, such as a 3×5 matrix or a 6×6 matrix. The planar size of the substrate 60b can be larger than that of the light-emitting area 60a formed by arrangement of the plurality of light-emitting elements 62. The shape of the substrate 60b is not limited to a square, a rectangular, a circular, or elliptical shapes. Generally, the shape of the substrate 60b can be consistent with that of the light inlet 71 of the light-converging member, such as both being rectangular, which is beneficial for improving light utilization efficiency.

It can be understood that through the aforementioned ambient image projection device, the light emitted by the first light source 11 sequentially passes through the light-converging member, the first lens 222, the display screen 21, the second lens 223, the lens assembly 221', and the distortion lens assembly 200 before being projected onto a carrier, resulting in an imaged picture.

In this embodiment, the first light source 11 is further connected to a heat-dissipation member 120 for dissipating heat from the first light source 11. Specifically, the heat-dissipation member 120 can be connected to the side of the first light source 11 opposite to the light-converging member 12, thereby dissipating heat from the first light source 11 to the periphery away from the projection assembly, thus avoiding issues such as excessive heat affecting the imaging effect and service life of the ambient image projection device.

Furthermore, as shown in FIGS. 11-18, the ambient image projection device further includes an optical module housing 50. The projection assembly 60, the lens assembly 221', and distortion lens assembly 200 are all arranged inside the optical module housing 50. The optical module housing 50 includes at least one air inlet 52. The ambient image projection device further includes a first heat-dissipation fan 23 located on the side of the projection assembly 60 that is opposite to the at least one air inlet 52, which allows air from the at least one air inlet 52 to be provided to the first heat-dissipation fan 23 through gaps between adjacent components of the projection assembly 60, thereby carrying heat away from the projection assembly 60. It can be understood that by placing the first heat-dissipation fan on the side away from the at least one air inlet 52, a cooling channel can be formed to dissipate heat from the projection assembly 60, reducing the overall temperature of the ambient image projection device.

The at least one air inlet 52 includes at least one first air inlet 220 and at least one second air inlet 230. The at least one first air inlet 220 corresponds to the position between the insulating glass 110 and the second lens 223, while the at least one second air inlet 230 corresponds to the position of the light-converging member 12. Specifically, the at least one second air inlet 230 includes several air intake through-holes. It can be understood that the design of multiple air inlets is beneficial for improving the heat dissipation effect.

By placing the at least one second air inlet 230 on the top of the optical module housing 50, air enters through the several air intake through-holes of the at least one second air inlet 230 from above, circulates around the light-converging member 12, and then enters the first heat-dissipation fan 23 from a lower side of the light-converging member 12. The hot air is ultimately drawn away by the first heat-dissipation fan 23 located below, which can significantly carry away heat from the light-converging member 12 and the first light source 11, thereby greatly improving the cooling effect.

The optical module housing 50 can include a first part 53 and a second part 54 connected sequentially along the optical path direction. The projection assembly 60 is arranged in the first part 53, while the lens assembly 221' and the distortion lens assembly 200 are placed in the second part 54. It can be understood that by using an integrated optical module housing 50 to align and install the projection assembly 60, the lens assembly 221', and the distortion lens assembly 200 together, it can ensure the structural strength of the ambient image projection device and further guarantee the alignment effect, thereby achieving a better imaging effect.

The first part 53 has multiple first mounting slots 350. Each of the first lens 222, the display screen 21, and the second lens 223 corresponds to and installed in one of these first mounting slots. The first mounting slots 350 can be sliding slots. The first part 53 is divided into an upper housing and a lower housing that are connected to each other. The first mounting slots 350 is arranged on the lower housing. When the upper housing is separated from the lower housing, the first lens 222, the display screen 21, and the second lens 223 can be slidably installed on or removed from the lower housing corresponding to the first mounting slots 350. It can be understood that arrangement of the first mounting slots 350 can fix the first lens 222, the display screen 21, and the second lens 223 in predetermined positions, facilitating assembly of each component while ensuring heat dissipation and imaging effects.

In this embodiment, the first mounting slot 350 adjacent to the first heat-dissipation fan 23 is further provided with dust-proof oil 352, which can adsorb dust and impurities, avoiding any impact on imaging.

As previously mentioned, the light-converging member 12 is conical with a gradually increasing diameter along the optical path direction D1. The shape of the part of the first part 53 where the light-converging member 12 is arranged is adapted to the light-converging member 12, ensuring not only their assembly but also making the design of the ambient image projection device more compact, which is beneficial for miniaturization and lightweighting.

In this embodiment, the display screen 21 is substantially rectangular. Therefore, a cross-section of the light-converging member 12 perpendicular to the optical path direction D1 can be rectangular. That is, the shape of the display screen 21 is adapted to and comparable in size to the cross-sectional shape of the light-converging member 12 perpendicular to the optical path direction D1, which can also contribute to improving the light utilization efficiency of the projection assembly 60.

Furthermore, the distortion lens assembly 200 and the optical module housing 50 are equipped with alignment and mating structures to facilitate their assembly. Specifically, the alignment and mating structures include, but are not limited to, alignment protrusions, grooves, labels, etc.

The at least one air inlet 52 is further provided with a dust-proof air intake membrane 521 to prevent dust and other debris from entering the interior of the ambient image projection device and affecting the imaging quality. The dust-proof air intake membrane 521 can be a non-woven fabric with multiple irregular air intake gaps, adhered to the optical module housing 50 using a colloid. It has advantages of low weight and good dust-proof air intake performance, but the specific material is not limited to the above.

In the ambient image projection device of this embodiment, the air outlet direction of the first heat-dissipation fan 23 is oriented towards the heat-dissipation member 120, so that it can blow air towards the heat-dissipation member 120 to carry away its heat, further improving the cooling effect.

Specifically, the heat-dissipation member 120 includes a heat dissipation substrate 12a that fixes the first light source 11 and multiple cooling fins 12b connected to the side of the heat dissipation substrate 12a that is away from the first light source 11. The multiple cooling fins 12b are spaced apart and extend to the air outlet of the first heat-dissipation fan 23, allowing the first heat-dissipation fan 23 to blow air into the gaps among the multiple cooling fins 12 to carry away the heat from the heat-dissipation member 120. The heat-dissipation member 120 may further include a second fixing hole 12c and a third fixing hole 12d. The second fixing hole 12c can be configured to fix the first light source 11, while the third fixing hole 12*d* can be configured to fix the heat-dissipation member 120 onto the optical module housing 50.

The first heat-dissipation fan 23 includes a fan housing 232 with an installation cavity 231 and fan blades 233 located within the installation cavity 231. The fan blades 233 can be turbine blades, and the direction of their fan shaft can be perpendicular to the optical path direction D1, allowing the fan blades 233 to guide the heat from the projection assembly 60 at the top towards the side where the first light source 11 is located.

In this embodiment, the fan housing 232 further has a fan air inlet 232*a* facing the projection assembly 60 and a fan air outlet 232*b*. At the fan air outlet 232*b*, there are multiple air guide vanes 234. The air blown between the multiple air guide vanes 234 is directed towards the heat-dissipation member 120 in parallel, which can more uniformly and effectively carry away the heat from the first light source 11 on the heat-dissipation member 120.

Additionally, the fan housing 232 can be snap-fitted onto the optical module housing 50, facilitating the assembly and disassembly of the first heat-dissipation fan 23.

In this embodiment, the ambient image projection device may further include at least one lens barrel. The lens assembly 221' can be installed within the at least one lens barrel and can move back and forth along the optical path direction D1 with the at least one lens barrel to adjust a projection focal length. However, it is necessary to ensure that there is always a distance between the distortion lens assembly 200 and the lens assembly 221' to ensure imaging.

Specifically, the at least one lens barrel may include a fixed lens barrel 14 and a movable lens barrel 15. The fixed lens barrel 14 is positioned in front of the movable lens barrel 15. The distortion lens assembly 200 is fixedly installed within the fixed lens barrel 14, while the lens assembly 221' is fixedly installed within the movable lens barrel 15. The movable lens barrel 15 can drive the lens assembly 221' to move back and forth to adjust the projection focal length. The back-and-forth movement of the at least one lens barrel along the optical path direction D1 can be automatically or manually adjusted.

In this embodiment, a focusing wheel 16 is sleeved on an exterior of the movable lens barrel 15, and the movement of the focusing wheel 16 can drive the movable lens barrel 15 to move back and forth. Specifically, the outer surface of the movable lens barrel 15 may be provided with external threads, while the inner surface of the focusing wheel 16 is provided with internal threads that match the external threads, which allows rotation of the focusing wheel 16 to drive the movable lens barrel 15 to bring the lens assembly 221' to move back and forth along the optical path direction D1 for focusing.

The front end of the optical module housing 50 is provided with two focusing wheel protruding holes 17 configured to allow both sides of the focusing wheel 16 protrude therethrough to an exterior of the optical module housing 50 respectively. With the aforementioned structure, when the focusing wheel 16 is turned, since it is restricted by the focusing wheel protruding holes 17 and cannot move back and forth, the movable lens barrel 15 is driven to move back and forth, which can then bring the lens assembly 221' to move back and forth to adjust the focal length.

Furthermore, in the optical module housing 50, the second part 54 includes a first section 541, a second section 542, and a third section 543 connected sequentially along the optical path direction D1. The diameter of the first section 541 gradually decreases along the optical path direction D1. The diameter of the second section 542 is larger than that of the first section 541 and the third section 543, and the second section 542 has the focusing wheel protrusion holes 17 for exposing the focusing wheel 16. The lens assembly 221' is positioned on the focusing wheel 16. Such three-section arrangement of the second part 54 not only matches the optical path of the ambient image projection device to ensure imaging but also contributes to the compactness of the overall design of the ambient image projection device, reducing size and weight of the ambient image projection device. Furthermore, through the focusing wheel 16 and the focusing wheel protrusion hole 17, manual or automatic focusing is also facilitated to ensure imaging effects.

More specifically, in this embodiment, the front end of the focusing wheel 16 is provided with a limiting structure 18. When the movable lens barrel 15 moves to the position of the limiting structure 18, the front end of the movable lens barrel 15 resists against the limiting structure 18, and at this time, there is still a distance between the lens assembly 221' and the distortion lens assembly 200, ensuring imaging.

In this embodiment, an engagement groove 19 that matches the fixed lens barrel 14 is provided inside the front end of the optical module housing 50, and the fixed lens barrel 14 can be precisely positioned, engaged, and fixed within the engagement groove 19.

Furthermore, in this embodiment, a positioning post 20 is provided on the outer surface of the fixed lens barrel 14, and a corresponding positioning hole is provided on the front end of the optical module housing 50. The positioning post 20 is configured to be inserted into the positioning hole.

Through the above-mentioned structures of the engagement groove 19, the positioning post 20, and the positioning hole, the fixed lens barrel 14 along with the distortion lens assembly 200 can be well fixed at the front end of the optical module housing 50, preventing changes in the distortion effect caused by the movement of the distortion lens assembly 200.

Embodiment 7

The structure of this embodiment is substantially the same as that of Embodiment 6. In other words, the description provided for Embodiment 6 of the present disclosure can generally be applied to Embodiment 7. The following mainly describes the differences between Embodiment 7 and Embodiment 6.

Figure 19:
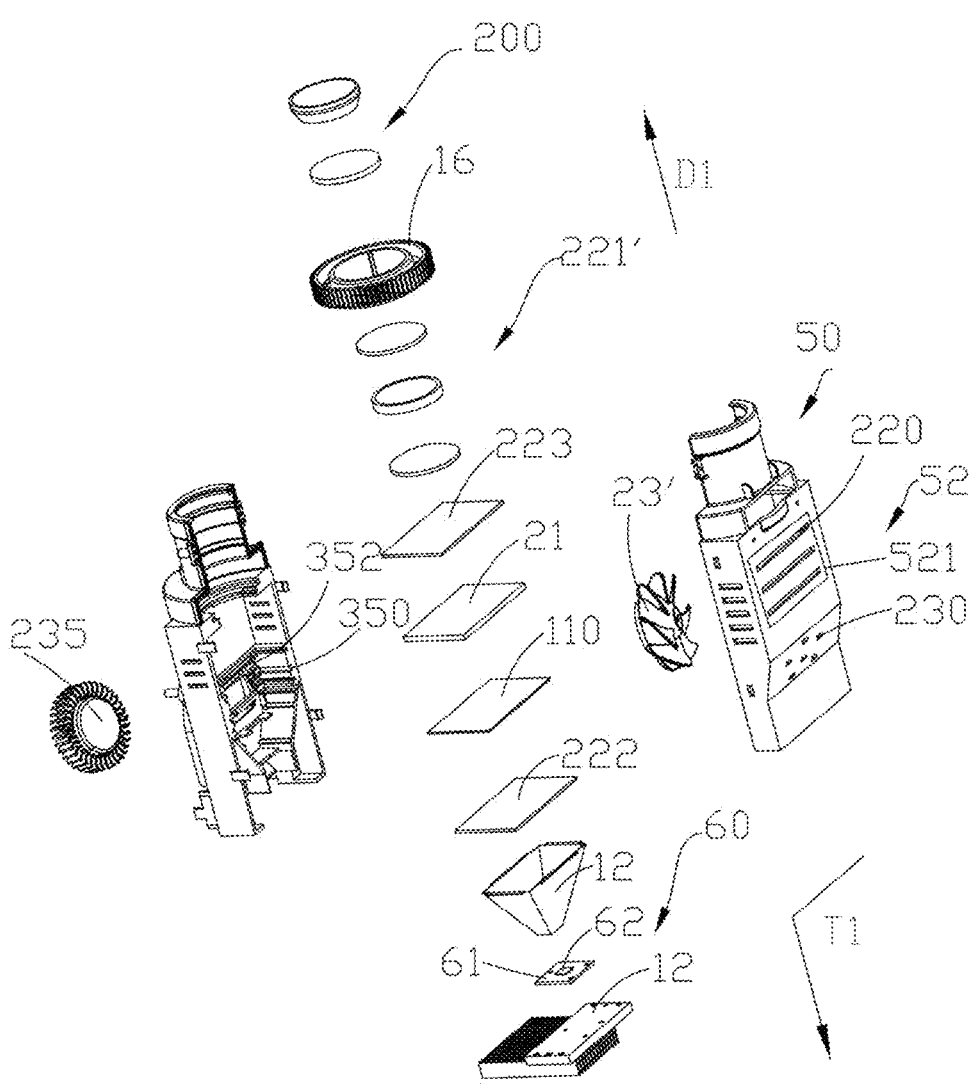
FIG. 19 is an exploded view of an ambient image projection device according to a seventh embodiment of the present disclosure.
Figure 20:
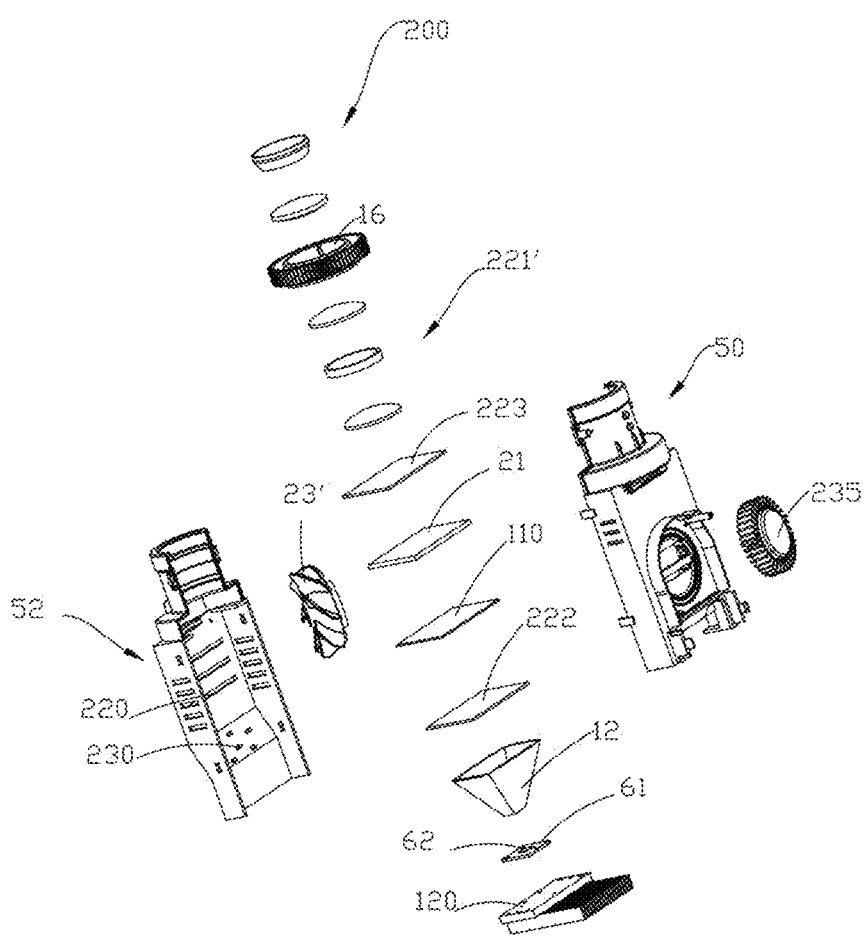
FIG. 20 is an exploded view of the ambient image projection device in the seventh embodiment of the present disclosure from another view.

In the seventh embodiment, as shown in FIGS. 19 and 20, the ambient image projection device may further include a second heat-dissipation fan 23'. The second heat-dissipation fan 23' can be installed at the least one air inlet 52. The second heat-dissipation fan 23' is used to blow air from the at least one air inlet 52 towards the projection assembly 60. It can be understood that the second heat-dissipation fan 23' can be located inside the optical module housing 50 and can be an axial fan. It is configured to draw air from the at least one air inlet 52 at the top of the optical module housing 50 into the housing 50, and then blow the air through the gaps between two adjacent components of the projection assembly 60 along the optical path direction D1 towards the first heat-dissipation fan 23'. In this embodiment, the first heat-dissipation fan 23 and the second heat-dissipation fan 23' are respectively installed on opposite sides of the optical module housing 50. Specifically, the second heat-dissipation fan 23' is adjacent to the air inlet 52 at the top of the optical module housing 50, and the second heat-dissipation fan 23' is installed adjacent to the bottom of the optical module housing 50 and directs the air from the projection assembly 60 above towards the rear end of the ambient image projection device, thus forming a heat-dissipation path Tl from top to bottom and then to the rear side. It can be understood that using two heat-dissipation fans 23 and 23' to dissipate heat from the projection assembly can improve heat-dissipation efficiency and imaging effects, as well as extend the service life of the ambient image projection device.

Embodiment 8

The structure of this embodiment is basically the same as that of Embodiment 6. That is to say, the description of Embodiment 6 in the present disclosure can generally apply to Embodiment 8. The following mainly describes the differences between them.

Figure 21:
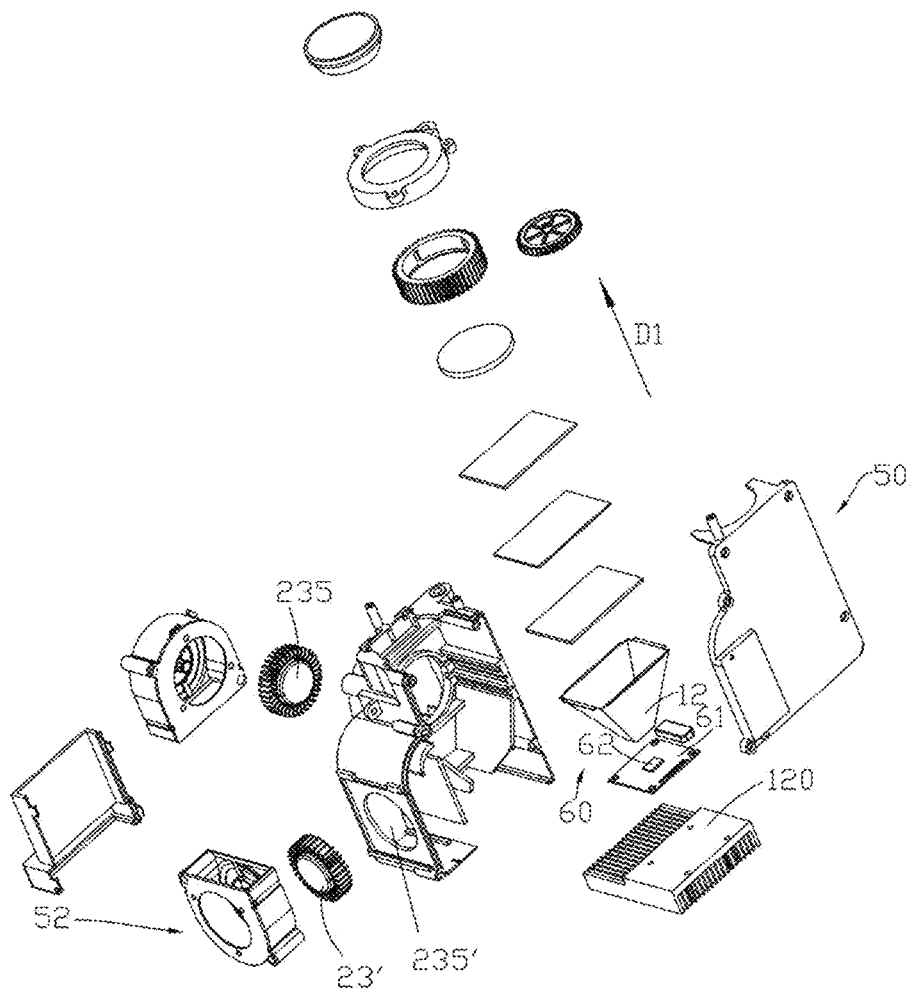
FIG. 21 is an exploded view of an ambient image projection device according to an eighth embodiment of the present disclosure.
Figure 22:
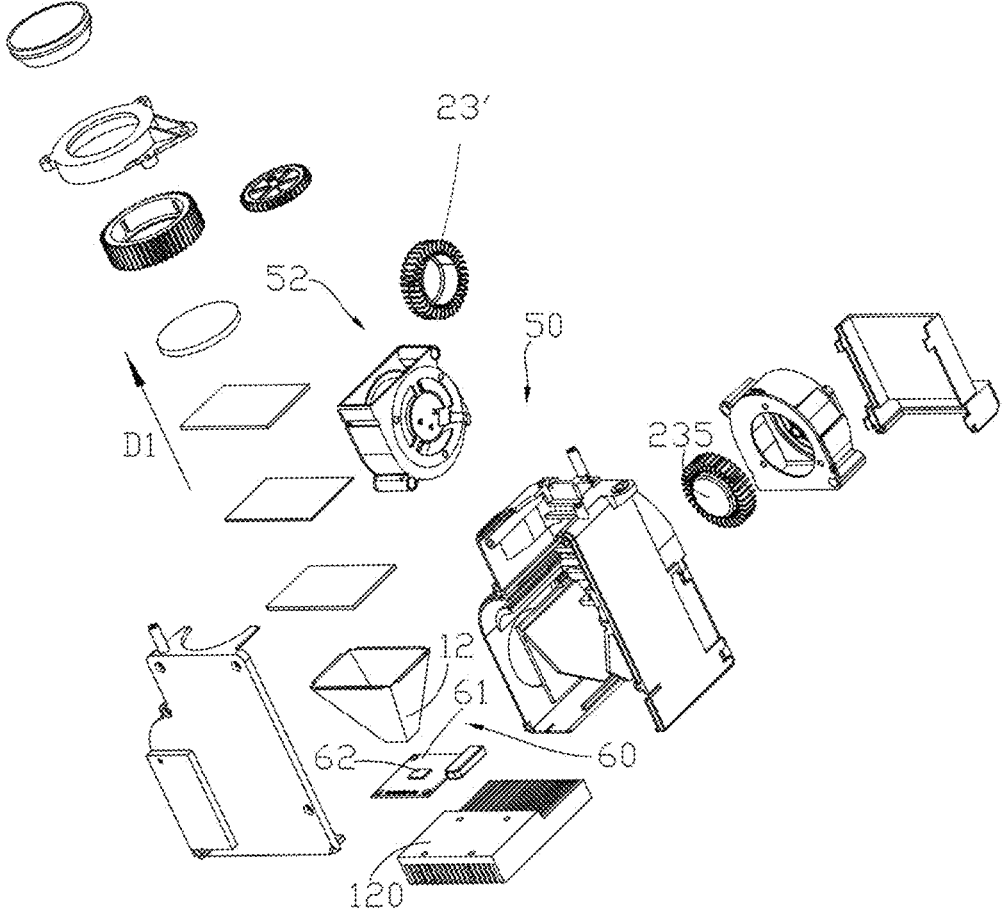
FIG. 22 is an exploded view of the ambient image projection device in the eighth embodiment of the present disclosure from another view.

In the eighth embodiment, as shown in FIGS. 21 and 22, the ambient image projection device may further include a second heat-dissipation fan 23'. The air inlet 52 of the ambient image projection device is arranged on a side of the optical module housing 50. An air duct 235' for accommodating the second heat-dissipation fan 23' is further formed inside the optical module housing 50. The outlet of the air duct 235' faces the gaps between two adjacent components in the projection assembly 60, so that the second heat-dissipation fan 23' is used to blow air from the at least one air inlet 52 towards the projection assembly 60.

It can be understood that in this embodiment, the second heat-dissipation fan 23' can be a turbo fan. The axial direction of the second heat-dissipation fan 23' can be perpendicular to that of the first heat-dissipation fan 23. The second heat-dissipation fan 23' is used to draw air from at least one air inlet 52 on the side of the optical module housing 50 into the optical module housing 50, and then blow the air through the gaps between two adjacent components along the optical path direction D1 of the projection assembly 60 towards the first heat-dissipation fan 23.

In this embodiment, the first heat-dissipation fan 23 and the second heat-dissipation fan 23' are respectively installed on two adjacent sides of the optical module housing 50. Specifically, the second heat-dissipation fan 23' is adjacent to the air inlet 52 on the side of the optical module housing 50, and the first heat-dissipation fan 2123 is installed adjacent to the bottom of the optical module housing 50 and directs the air from the projection assembly 60 above towards the rear end of the ambient image projection device, thus forming a heat-dissipation channel from the side to the bottom and then to the rear side. It can be understood that using two heat-dissipation fans 23 and 23' to dissipate heat from the projection assembly can improve heat-dissipation efficiency and imaging effects, as well as extend the service life of the ambient image projection device.

Embodiment 9

The structure of this embodiment is basically the same as that of Embodiment 6. That is to say, the description of Embodiment 6 in the present disclosure can generally apply to Embodiment 9. The following mainly describes the differences between the two embodiments.

Figure 23:
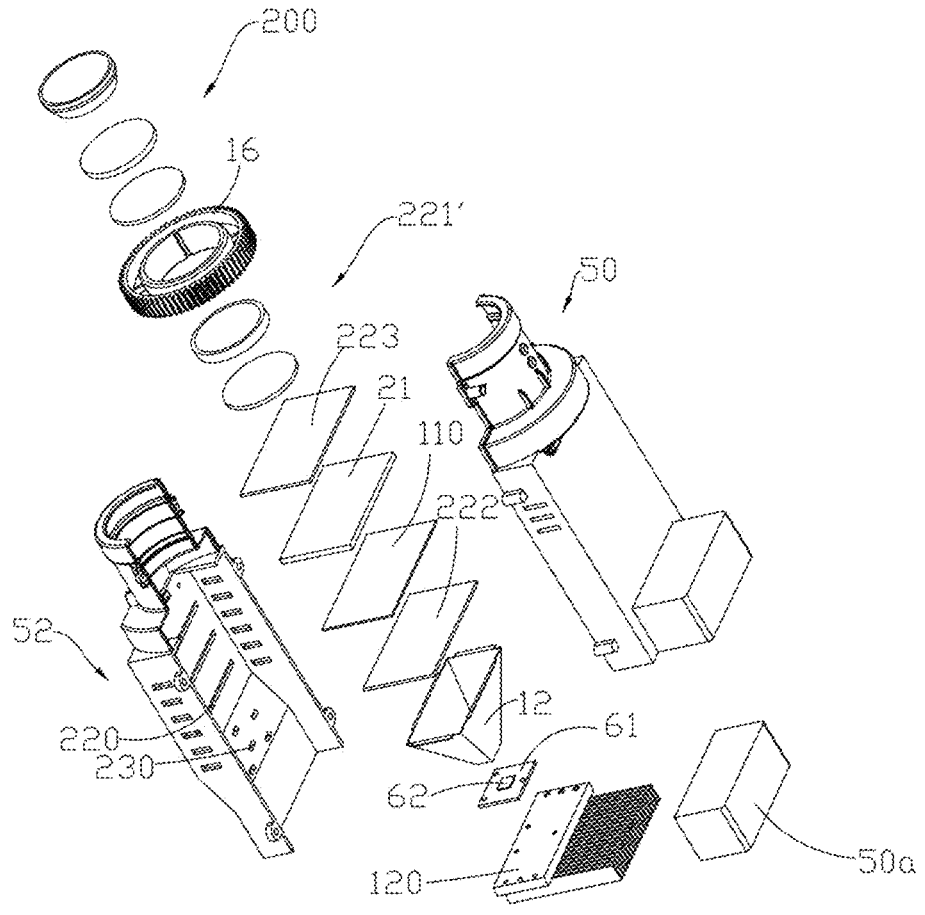
FIG. 23 is an exploded view of an ambient image projection device according to a nineth embodiment of the present disclosure.
Figure 24:
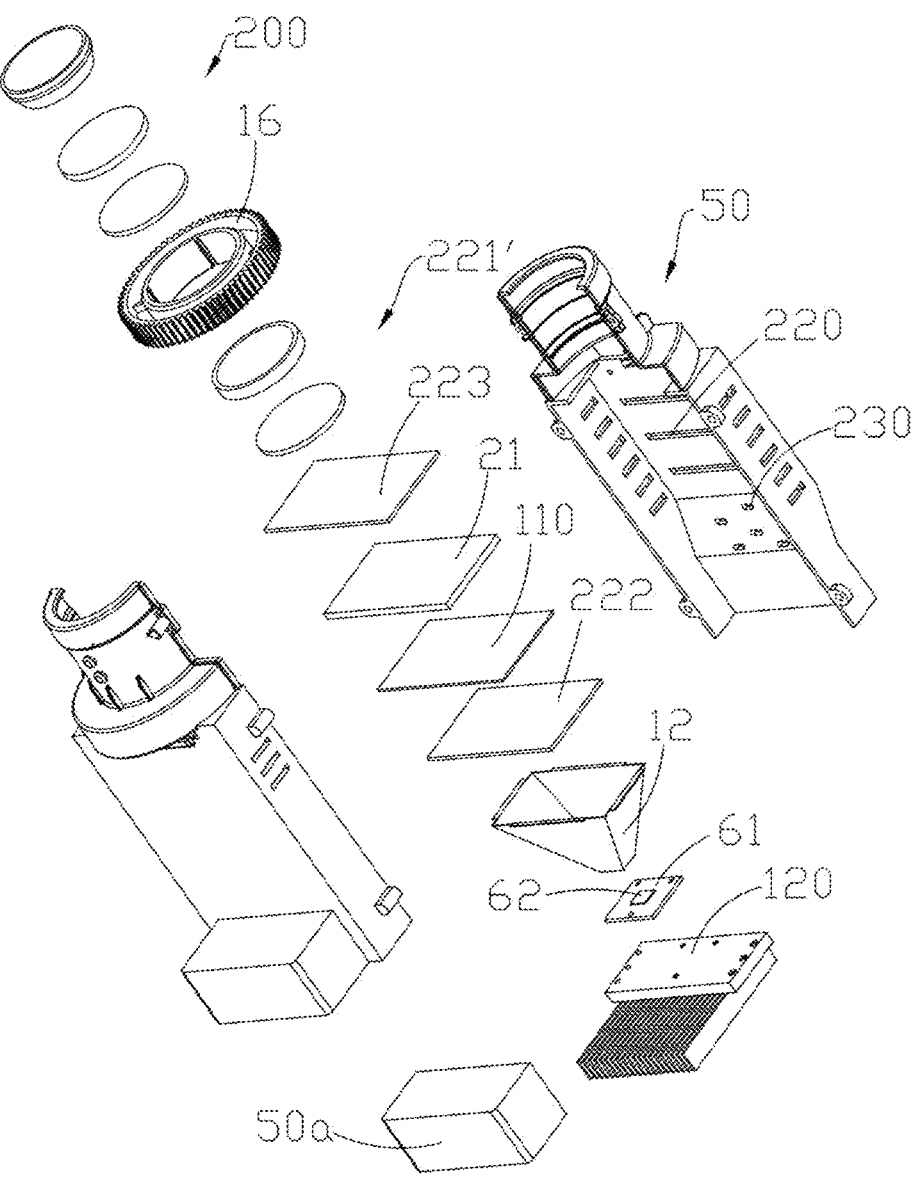
FIG. 24 is an exploded view of the ambient image projection device in the nineth embodiment of the present disclosure from another view.

As shown in FIGS. 23 and 24, the ambient image projection device in the nineth embodiment omits the cooling fan compared to that in the sixth embodiment, eliminating the need for air vents on a bottom plate of a lower portion of the optical module housing 50. Specifically, the lower portion of the optical module housing 50 is integrally formed with a protruding heat-dissipation member accommodation section 50a, within which the heat-dissipation member 120 is installed. It is understandable that this arrangement can result in a lighter and smaller ambient image projection device, facilitating portability.

Embodiment 10

The structure of this embodiment is substantially the same as that of Embodiment 6. In other words, the description provided for Embodiment 6 of the present disclosure can generally be applied to Embodiment 10. The following mainly describes the differences between the two embodiments.

Figure 25:
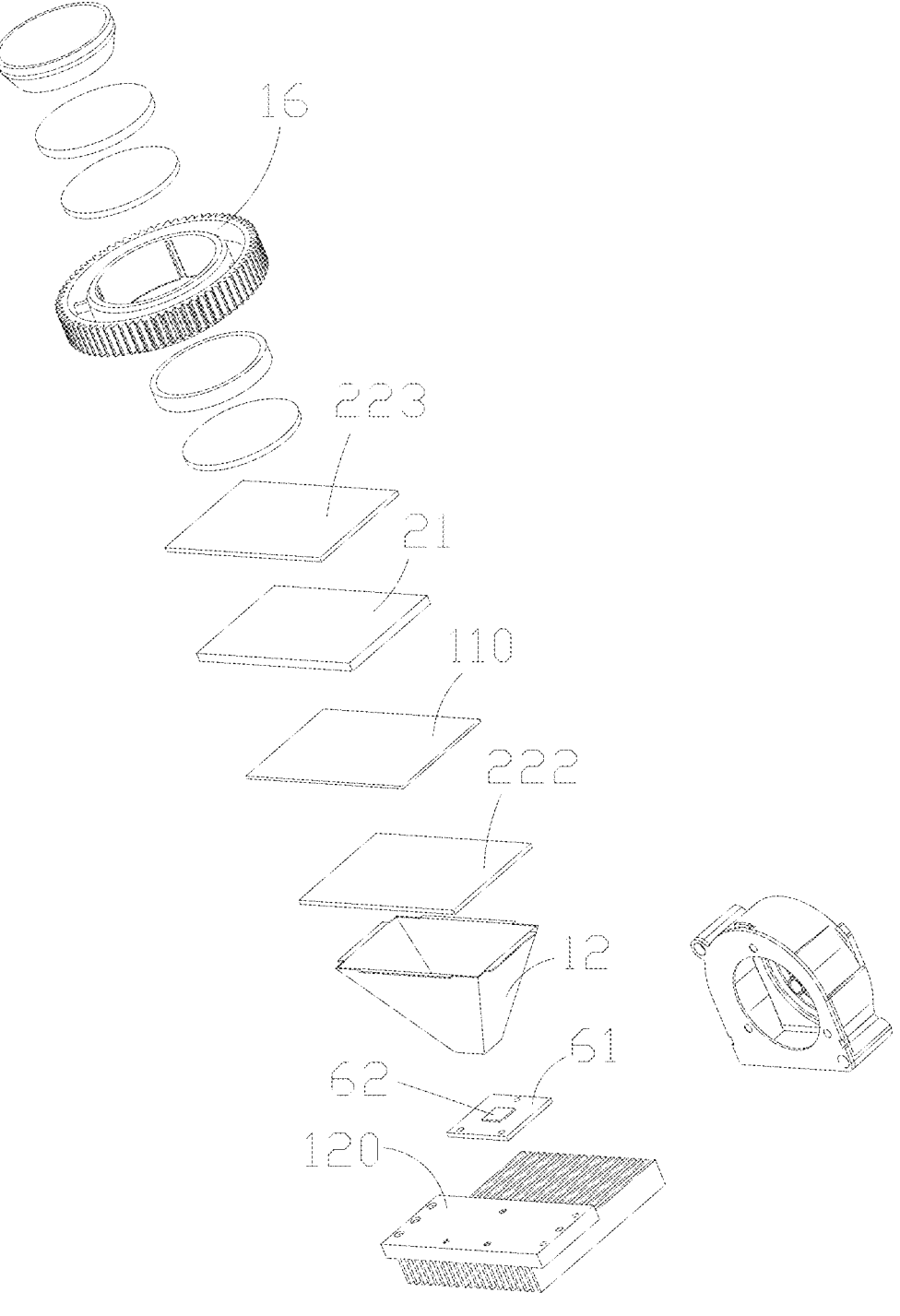
FIG. 25 is an exploded view of an ambient image projection device according to a tenth embodiment of the present disclosure.

As shown in FIG. 25, the ambient image projection device in the tenth embodiment omits the optical module housing compared to that in the sixth embodiment. This means that the components inside the optical module housing of sixth embodiment can be placed on a housing of a terminal product that uses the ambient image projection device. In other words, the housing of the terminal product integrates the functions of the optical module housing, achieving a compact and lightweight design for the terminal product.

Embodiment 11

The structure of this embodiment is substantially the same as that of Embodiment 6. In other words, the description provided for Embodiment 6 of the present disclosure can generally be applied to Embodiment 11. The following mainly describes the differences between the two embodiments.

Figure 26:
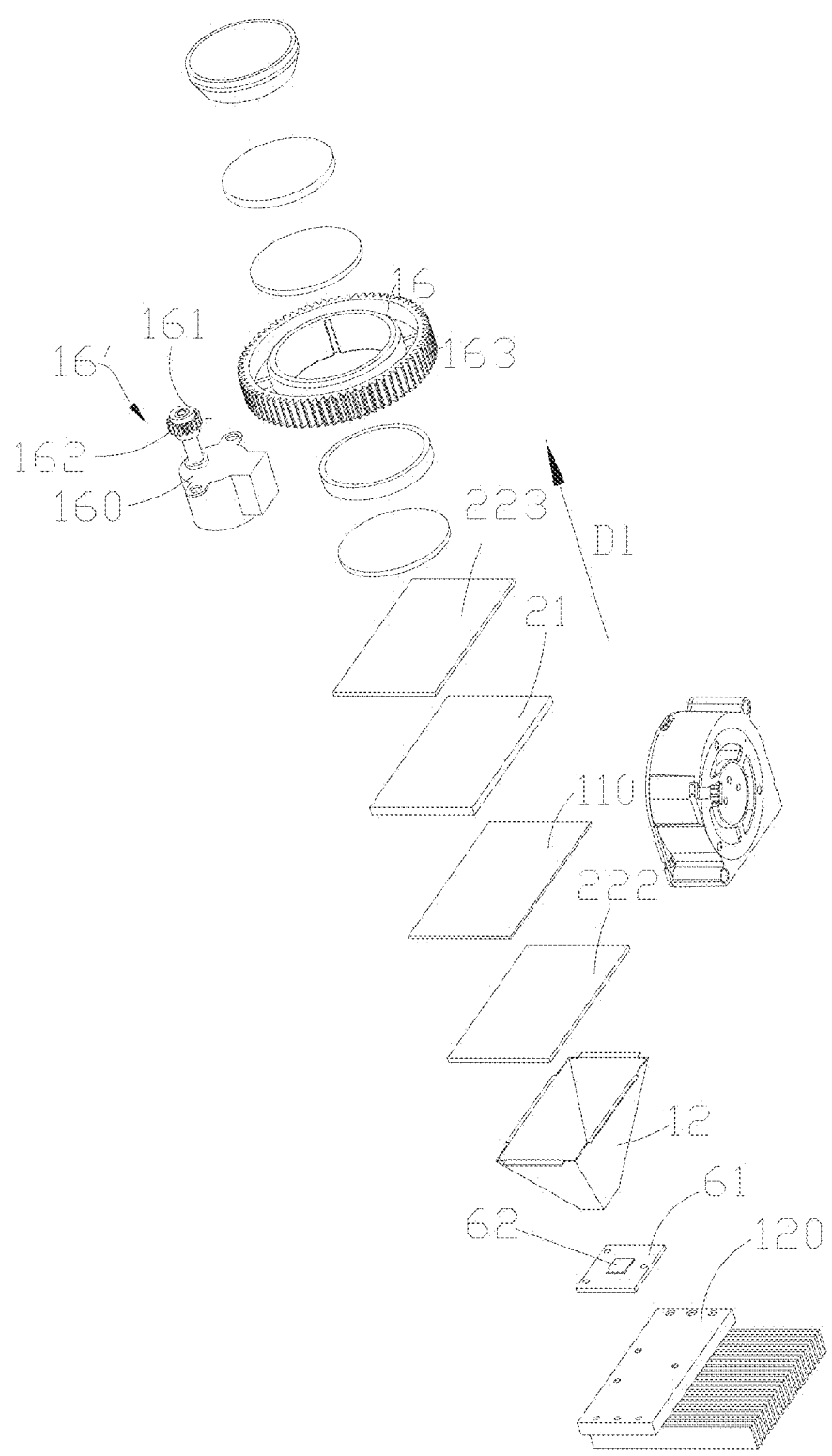
FIG. 26 is an exploded view of an ambient image projection device according to an eleventh embodiment of the present disclosure.

As shown in FIG. 26, the ambient image projection device in Embodiment 11 includes an additional drive device 16' compared to that in Embodiment 6. The drive device 16' is configured to drive the at least one lens barrel to move back and forth along the optical path direction D1 for projection focal length adjustment. Specifically, the drive device 16' can drive the focusing wheel 16 to move the movable lens barrel 15 along the optical path direction D1.

The drive device 16' may include a motor 160. An axial direction of an output shaft 161 of the motor 160 may be the same as the optical path direction D1. The output shaft 161 is equipped with a first meshing structure 162, and the outer surface of the focusing wheel 16 is equipped with a second meshing structure 163. The first meshing structure 162 and the second meshing structure 163 mesh with each other, so that when the output shaft 161 of the motor 160 rotates, the first meshing structure 162 rotates, driving the second meshing structure 163 to rotate as well. Consequently, the focusing wheel 16 rotates and drives the movable lens barrel 15, which is threadedly connected to the focusing wheel 16, to move along the optical path direction D1 for focusing.

Embodiment 12

The structure of this embodiment is substantially the same as that of Embodiment 6. In other words, the description provided for Embodiment 6 of the present disclosure can generally be applied to Embodiment 12. The following mainly describes the differences between the two embodiments.

Figure 27:
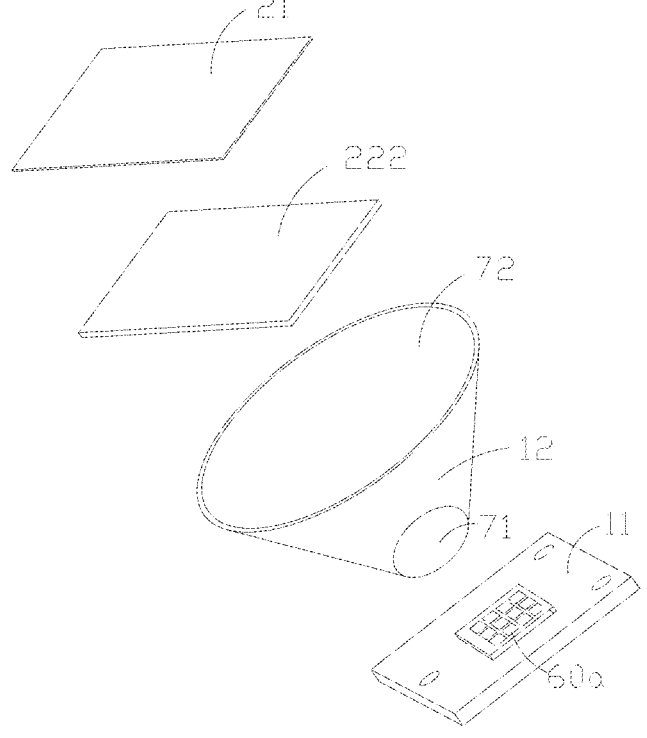
FIG. 27 is an exploded view of an ambient image projection device according to a twelfth embodiment of the present disclosure.

In this embodiment, as shown in FIG. 27, the light inlet 71, the light outlet 72, and the cross-section of the light-converging member 12 are all circular. The light-emitting area 60a of the first light source 11 can be circular and sized to match the light inlet 71. Correspondingly, the first lens 222 (or the second lens 223) at the light outlet 72 and the display screen 21 can be circular, allowing for shape compatibility among the components to achieve high light utilization efficiency and compact structural design. However, it is understandable that in some modified embodiments, the shapes of the cross-section of the light-converging member 12, the light-emitting area 60a of the first light source 11, the first lens 222 (or the second lens 223) at the light outlet 72, and the display screen 21 may vary. Slightly lower light utilization efficiency or slightly larger product dimensions due to shape incompatibility will not affect the basic projection and imaging performance of the ambient image projection device.

Embodiment 13

The structure of Embodiment 13 is substantially the same as that of Embodiment 6. In other words, the description provided for Embodiment 6 of the present disclosure can generally be applied to Embodiment 13. The following mainly describes the differences between the two embodiments.

Figure 28:
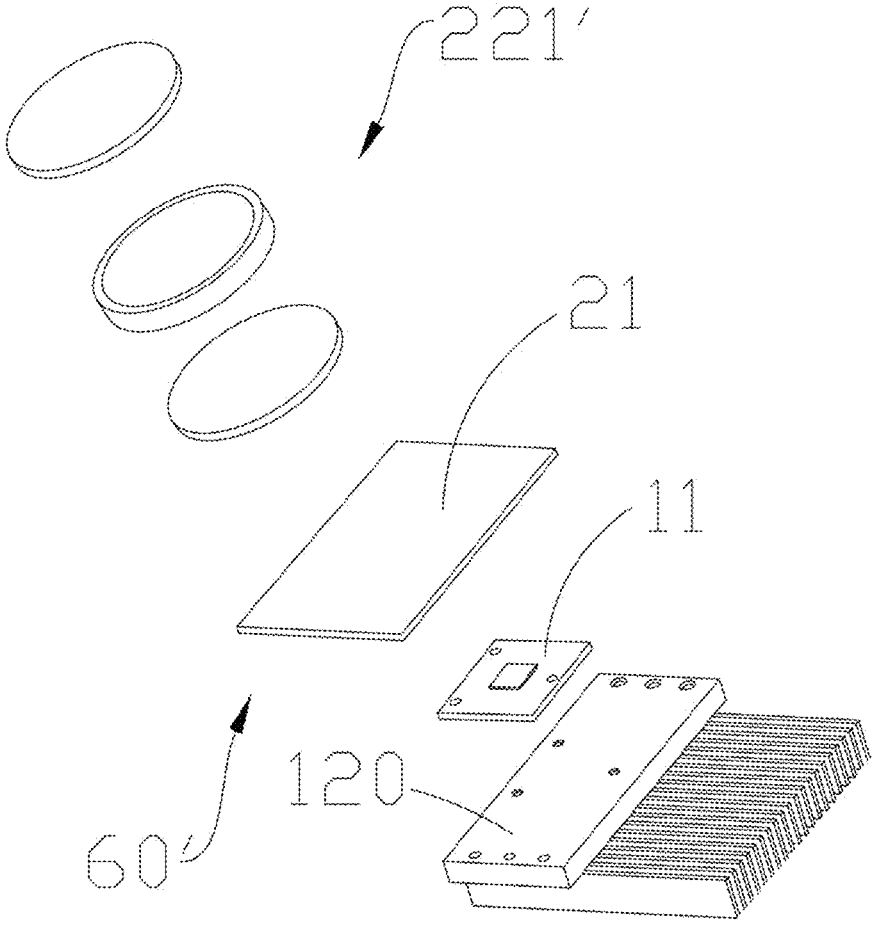
FIG. 28 is an exploded view of an ambient image projection device according to a thirteenth embodiment of the present disclosure.

As shown in FIG. 28, the projection assembly 60' of the ambient image projection device in Embodiment 13 omits the light-converging member, the first lens, and the second lens compared to that in Embodiment 6. This means that the light emitted from the first light source 11 can be directly projected onto the display screen 21, which then projects the image through the lens assembly 221'.

Figure 29:
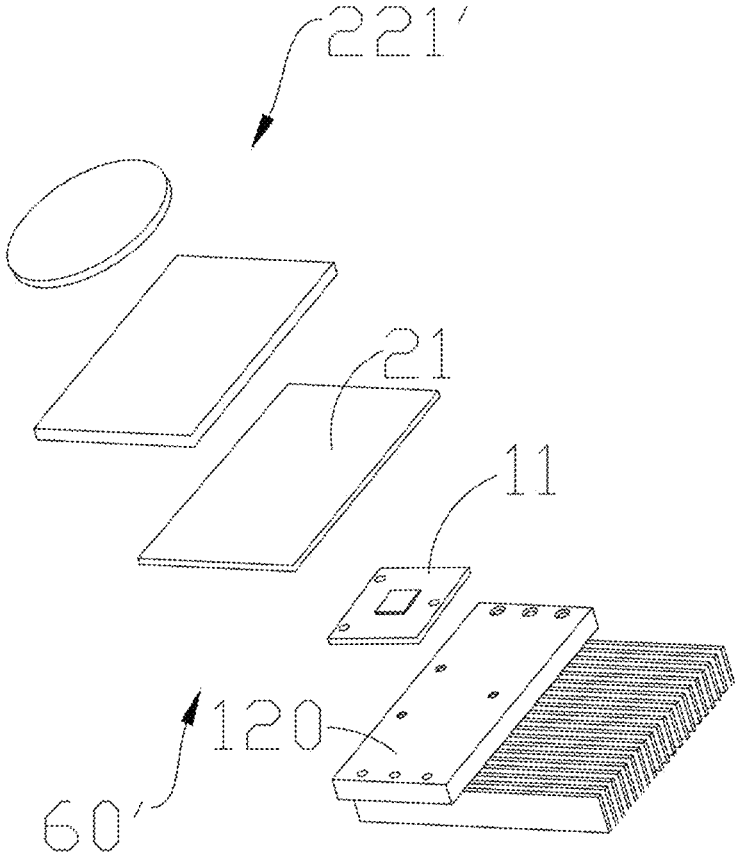
FIG. 29 is an exploded view of an ambient image projection device according to a variant embodiment of the thirteenth embodiment of the present disclosure.
Figure 30:
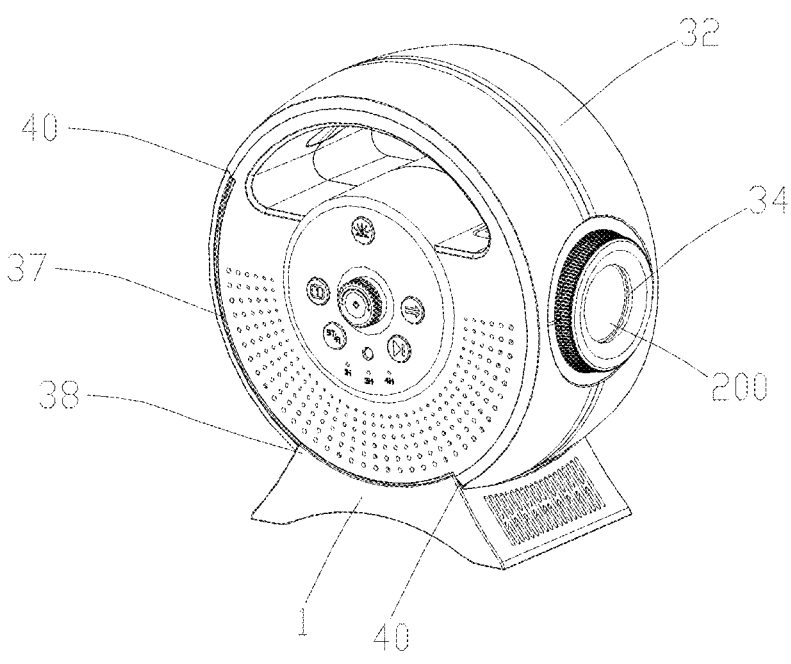
FIG. 30 is a schematic structural diagram of an ambient image projection device according to a fourteenth embodiment of the present disclosure.
Figure 31:
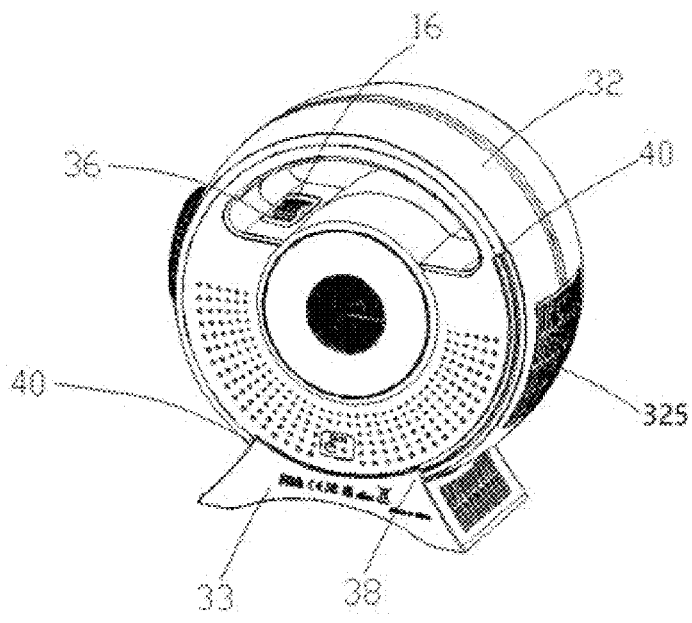
FIG. 31 is a schematic structural diagram of the ambient image projection device in FIG. 30 from another view.

Additionally, in some modified embodiments, as shown in FIG. 29, the number of lenses in the lens assembly 221" can be reduced to just one convex lens, as long as it can fulfill the projection function.

Omitting the light-converging member, the first lens, the second lens, and some lenses in the lens assembly 221 can reduce the product weight, facilitating portability.

Furthermore, in the embodiments shown in FIGS. 28 and 29, the light emitted from the first light source 11 can be controlled within a preset angle, ensuring that substantially all of the light emitted from the first light source 11 is provided to the display screen 21 after passing through a preset transmission space, thereby guaranteeing the light utilization efficiency of the projection assembly 60'.

Embodiment 14

As shown in FIGS. 30 to 38, in addition to all the components of any one of Embodiments 5 to 13, the ambient image projection device in this embodiment further includes an outer housing.

Specifically, the outer housing may include a main housing 32 and a base 33. The main housing 32 is movably mounted on the base 33 to facilitate adjustment of the projection angle of the ambient image projection device. The optical module housing 50 can be placed inside the main housing 32, which is equipped with a projection aperture 34 corresponding to the distorted lens assembly 200.

Specifically, the front end of the optical module housing 50 can be inserted into the projection aperture 34, while the rear end of the optical module housing 50 is placed into a first receiving groove 320 on the inner wall of the main housing 32, enabling simple and convenient assembly of the ambient image projection device. Additionally, the main housing 32 is equipped with a focusing aperture 36 through which the focusing wheel 16 protrudes, facilitating easy operation.

The main housing 32 can be assembled by joining a left housing 323 and a right housing 322. A front cover 323 with the projection aperture 34 is provided at the front end, while a rear cover 324 is provided at the rear end. The rear cover 324 is integrated with the main housing 32, and the first receiving groove 322 is arranged on the rear cover 324 for securing rear-end components (such as the heat-dissipation member 120) of the ambient image projection device. Multiple heat dissipation holes 325 are provided on the bottom plate of the first receiving groove 320 for heat-dissipation member 120 heat dissipation.

Furthermore, the sides of the main housing 32 are provided with first sliding structures (e.g., sliding grooves 37). Correspondingly, sidewalls 38 extend from both sides of the base 33, with second sliding structures (e.g., sliding blocks 39) extending inwardly from the sidewalls 38. The first and second sliding structures cooperate (e.g., sliding blocks 39 are inserted into sliding grooves 37), enabling the main housing 32 to slide relative to the base 33 and adjust the position of the preset ambient imaging scene of the ambient image projection device.

During use, the main housing 32 slides relative to the base 33 via the cooperation of the sliding grooves 37 and sliding blocks 39. This sliding structure ensures a stable and reliable relative movement between the main housing 32 and the base 33. Additionally, the main housing 32 is directly connected to the base 33 without the need for additional connectors, simplifying the structure, reducing the risk of structural failures, and lowering production costs.

Furthermore, the main housing 32 is circular, with the first sliding structures (e.g., sliding grooves 37) arranged along the edges of the top and bottom surfaces, forming an arc-shaped structure (e.g., arc-shaped sliding grooves). Correspondingly, the second sliding structures include arc-shaped sliding blocks 39 on the sidewalls 38 of the base 33. Multiple sliding blocks 39 can be provided on each sidewall 38. During use, the main housing 32 can rotate relative to the base 33, which is more convenient in operation. Additionally, stoppers 40 are provided at both ends of the sliding grooves 37 to limit the rotation travel of the main housing 32.

Furthermore, the base 33 is equipped with damping pads 41 that conform to the bottom of the main housing. Multiple damping pads can be provided. The damping pads 41 enhance the adhesion between the main housing 32 and the base 33. When the main housing 32 rotates, the damping pads 41 provide flexible friction, ensuring a smooth rotation without noticeable friction sounds and providing a comfortable user experience. Additionally, they prevent wear and tear on components due to rigid contact between the main housing 32 and the base 33, extending the lifespan of the ambient image projection device. Combined with the aforementioned structure, the weight of the main housing 32 ensures continuous contact with the damping pads 41, preventing loss of function of the damping pads due to wear. Moreover, when the built-in speaker of the ambient image projection device operates, the damping pads 41 absorb vibrations, ensuring stable projection without shaking or movement, effectively enhancing the user experience. They also reduce the risk of product resonance, preventing abnormal noises or structural fatigue caused by resonance.

Of course, the relative movement structure between the main housing 32 and the base 33 can take various forms (e.g., rotation, detachable connections, or other movable connection structures). However, the aforementioned structures are provided only as examples, and other structural forms are not listed here one by one.

Furthermore, the bottom of the base 33 is provided with foot pads 42. Four foot pads can be provided, which is merely an example and not a limitation on the specific quantity. The foot pads 42 provide stable placement and anti-slip functionality for the ambient image projection device, reducing vibrations transmitted to the surface when the built-in speaker operates. They also prevent scratches and damage during placement and compensate for uneven placement surfaces.

Figure 37:
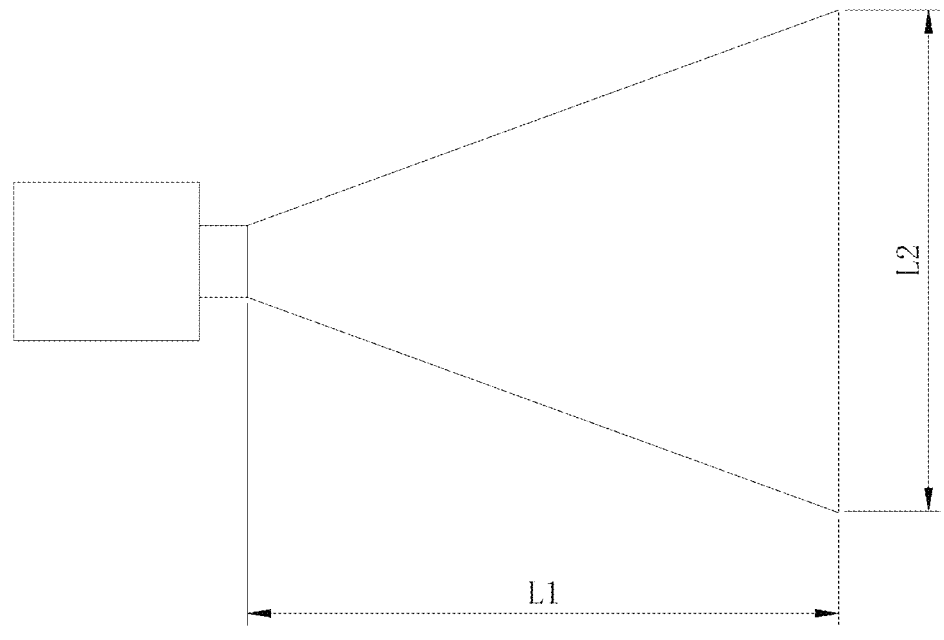
FIG. 37 is a schematic diagram illustrating a projection ratio of the ambient image projection device shown in FIG. 30.
Figure 38:
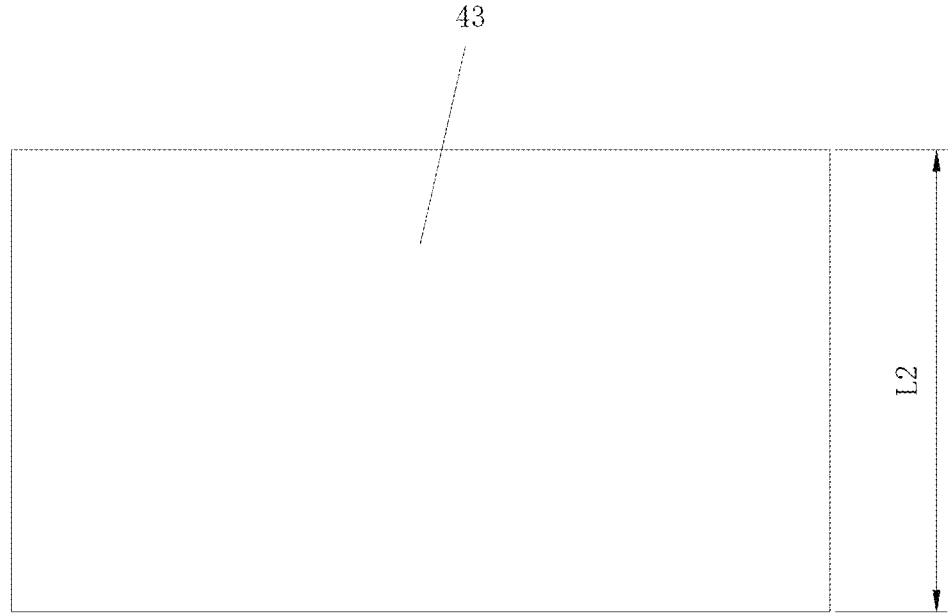
FIG. 38 is a schematic diagram showing a projected image of the ambient image projection device shown in FIG. 30.

Furthermore, as shown in FIGS. 37 and 38, the projection ratio of the ambient image projection device can be less than or equal to 0.9. The projection ratio refers to the ratio of the projection distance L1 to the width L2 of the projected image, where L2 represents the width of the projected image 43. Thus, the projection ratio is calculated as L1/L2. Additionally, due to variations in the thickness and concave-convex shapes of the lenses, their curvatures differ, resulting in varying refractive indices for light. In the ambient image projection device of the present disclosure, the lens assembly 221' includes the first convex lens 221*a*, the plano-concave lens 221*b'*, and the second convex lens 221*c*. The aforementioned projection ratio is achieved through the mutual cooperation among the first convex lens 221*a*, the plano-concave lens 221*b'*, and the second convex lens 221*c*, or through the combination of the lens assembly 221' and the distorted lens group 200. Furthermore, the projection focal length can be adjusted by modifying the curvatures of these lenses, thereby adjusting the projection ratio. Specifically, the projection ratio of the ambient image projection device can be adjusted to be less than or equal to 0.9 to achieve desired technical effects of the present disclosure.

Figure 39:
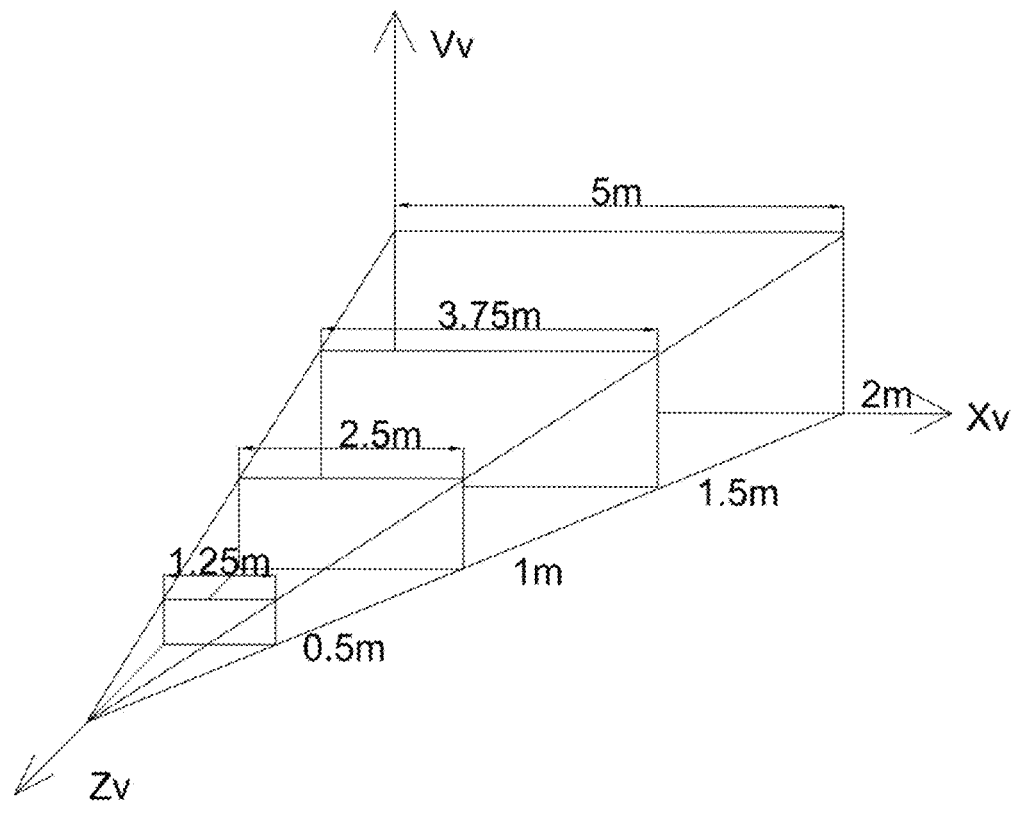
FIG. 39 is a schematic diagram explaining a range of the projection ratio for the ambient image projection device shown in FIG. 30.

As shown in FIG. 39, in one embodiment, the projection ratio can be less than or equal to 0.4. Specifically, when the projection distance is 0.5 m, the width of the projected image is equal to 1.25 m; when the projection distance is 1 m, the width of the projected image is greater than or equal to 2.5 m; when the projection distance is 1.5 m, the width of the projected image is greater than or equal to 3.75 m; and when the projection distance is 2 m, the width of the projected image is greater than or equal to 5 m. For an ambient image projection device equipped with a distorted lens group 200, maintaining a projection ratio around 0.4 can achieve optimal technical effects.

Figure 32:
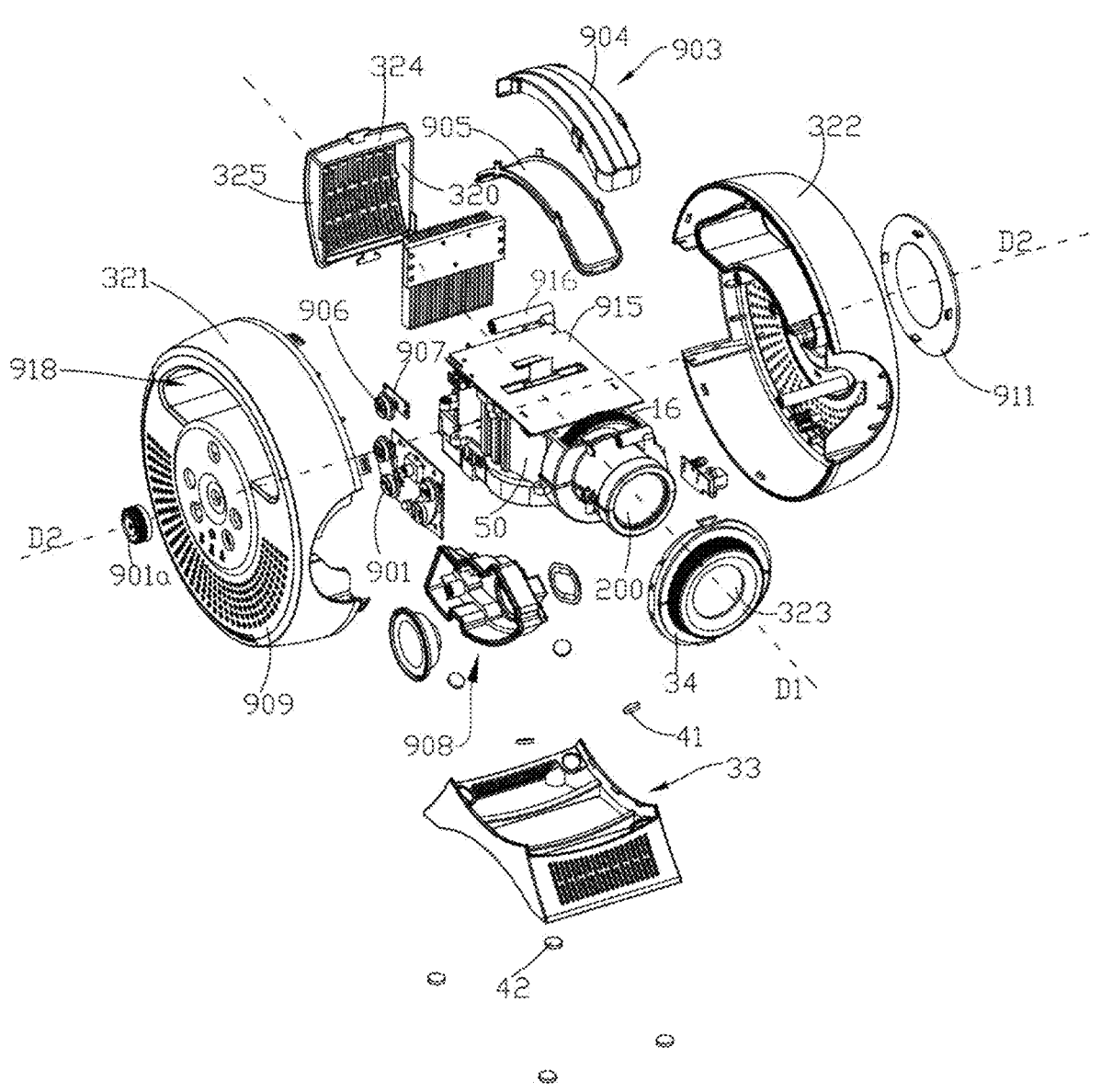
FIG. 32 is an exploded view of the ambient image projection device in FIG. 30.
Figure 33:
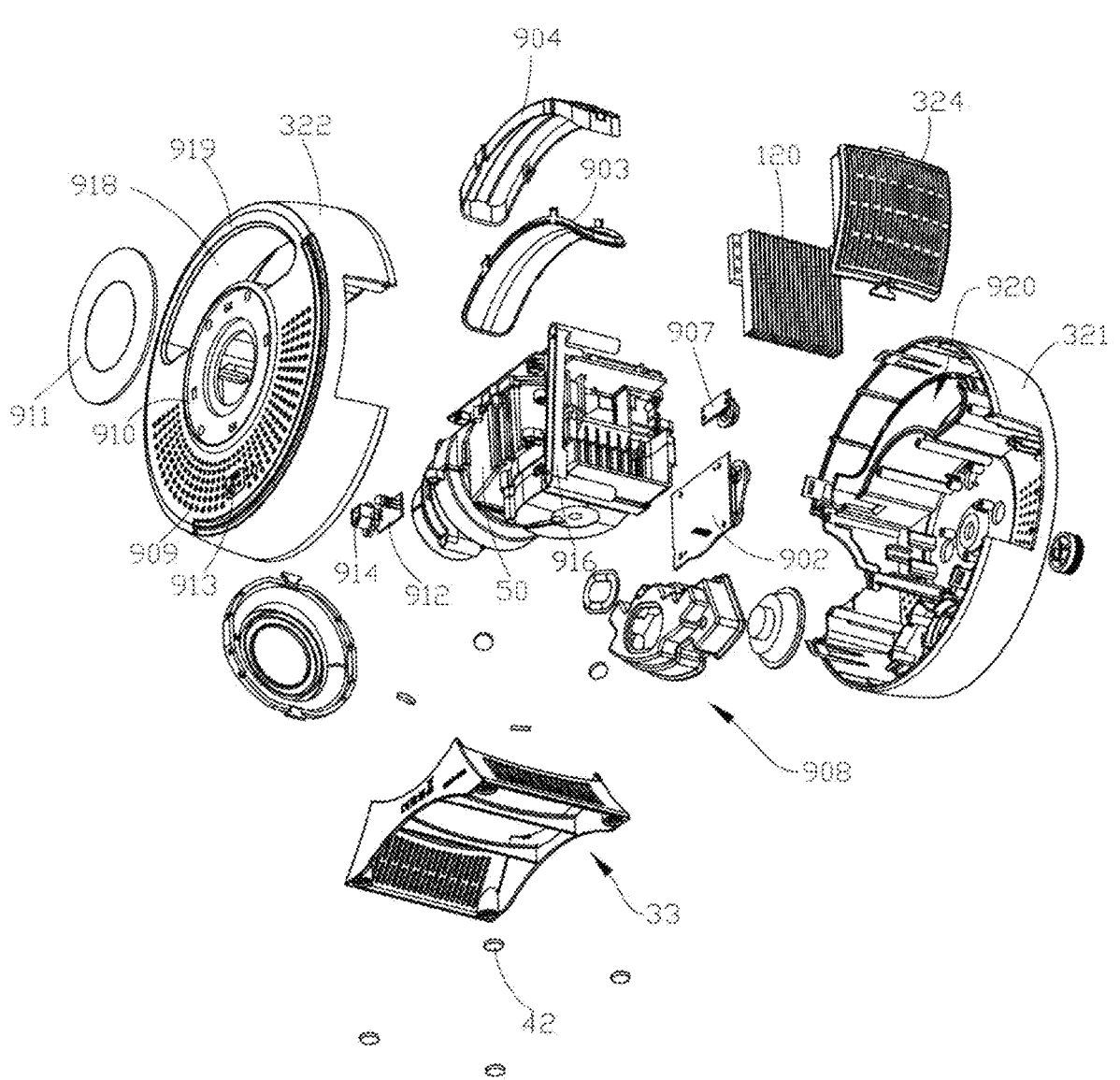
FIG. 33 is an exploded view of the ambient image projection device in FIG. 30 from another view.
Figure 34:
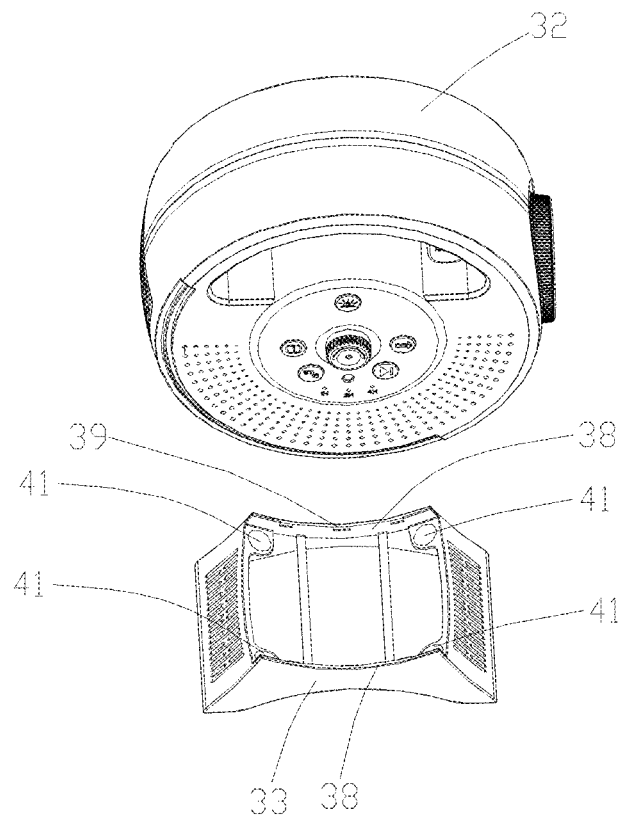
FIG. 34 is a schematic diagram showing separation of a main housing and a base of the ambient image projection device shown in FIG. 30.
Figure 35:
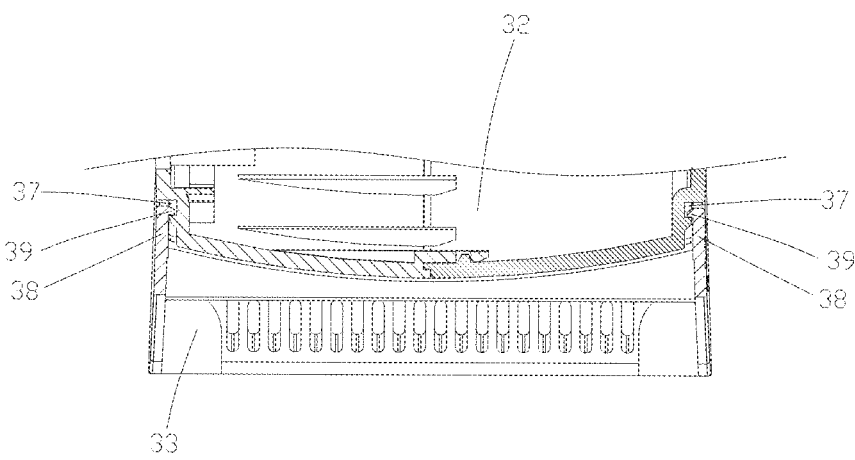
FIG. 35 is a partial sectional view illustrating assembly of the main housing and the base of the ambient image projection device shown in FIG. 30.
Figure 36:
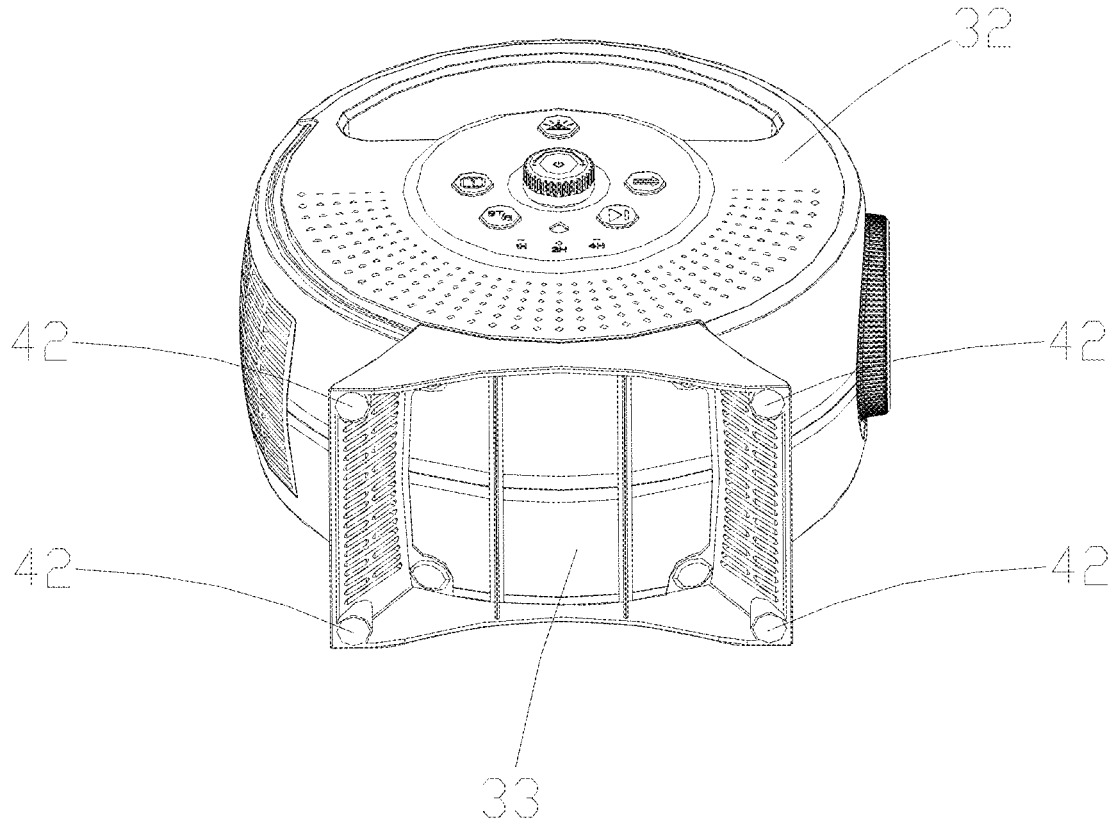
FIG. 36 is a schematic diagram of the ambient image projection device shown in FIG. 30 from another angle.

Furthermore, as shown in FIGS. 32 and 33, the left housing 323 and the right housing 322 are arranged and snap-fitted together along the direction D2, which is perpendicular to the optical axis direction D1. In this embodiment, the main housing 32 can be cylindrical, with its central axis aligned along direction D2. Through the first and second sliding structures, the main housing 32 can slide relative to the base 33 around direction D2 to adjust the optical axis direction D1, thereby adjusting the projection angle.

A plurality of control buttons 901 are arranged on one side of the main housing 32. The ambient image projection device further includes a button circuit board 902, which is positioned between the optical module housing 50 and the multiple control buttons 901. The plane of the button circuit board 902 can be perpendicular to the direction D2. The plurality of control buttons 901 include functions such as forward, backward, pause, play (e.g., single-loop, sequential-loop), and volume adjustment, enabling control over the playback and volume of the ambient projection images. Among the plurality of control buttons 901, there is a stepless adjustment knob 901*a*, which can be arranged at the center of one side of the main housing 32 for both aesthetic and ease of operation.

In this embodiment, the ambient image projection device further includes a night light module 903, which is positioned on the side of the main housing 32 away from the base

33. The night light module 903 comprises a night light box 904, a night light cover 905, a night light control button 906, and a night light control board 907. The night light control button 906 and the night light control board 907 are correspondingly arranged. The night light control button 906 is installed on one side of the main housing 32 and can be located on the same side as the plurality of control buttons 901, with the night light control button 906 positioned above the multiple control buttons 901. The night light control board 907 is located above the button circuit board 902. The night light box 904 is electrically connected to the night light control board 907 and contains a light-emitting element. When the user operates the night light control button 906, it triggers the night light control board 907 to generate a control signal, which is used to control activation, deactivation, and/or light adjustment of the night light box 904.

The ambient image projection device further includes a speaker module 908 arranged in the lower area of the inner cavity of the main housing 32, such as below the button circuit board 902, and is positioned adjacent to the base 33. Multiple through-holes 909 are provided on the lower sides of both sides of the main housing 32. These through-holes 909 can be configured for heat dissipation and sound transmission. At the center of the outer surface on the side of the main housing 32 away from the plurality of control buttons 901, there is a recess 910, onto which a decorative cover 911 is snap-fitted.

The ambient image projection device further includes an interface circuit board 912. An opening 913 is provided on the side of the main housing 32 away from the plurality of control buttons 901. The interface connectors 914 on the interface circuit board 912 are exposed through the opening 913 to connect with external devices for charging and/or data exchange. The opening 913 can be positioned beneath the decorative cover 911.

The ambient image projection device further includes a main circuit board 915, which can be arranged above the optical module housing 50 and corresponds to the air inlet 52. This arrangement not only makes the internal structure more compact but also allows some of the heat generated by the main circuit board 915 to be dissipated through the air inlet 52. The main circuit board 915 is electrically connected to the night light control board 907, the button circuit board 902, the interface circuit board 912, the projection assembly 60 (including the light source 11 and the display screen 21), and the first heat-dissipation fan 23. A controller on the main circuit board 915 is used to control the night light control board 907, the button circuit board 902, the interface circuit board 912, the projection assembly 60, and the first heat-dissipation fan 23.

A mounting bracket 916 can be provided inside the main housing 32. The mounting bracket 916 is configured to secure the optical module housing 52 to the inner side of the main housing 32. The mounting bracket 916 may include a U-shaped structure that clamps onto at least three sides of the optical module housing 52. This mounting bracket 916 not only has a simple structure but also provides a good fixing effect, improving the stability of the product.

Furthermore, there is a through opening area 918 on the top of the main housing 32, forming a handle structure 919 above the opening area 918. The night light box 904 is arranged inside the handle structure 919. The handle structure 919 further includes a mounting opening 920 adjacent to the opening area 918, onto which the night light cover 905 is installed. The night light box 904 emits light towards the opening area 918 through the night light cover 905. This lighting design achieves a concealed lighting effect, preventing excessively high light intensity from affecting the projection quality.

Furthermore, in this embodiment, the focusing hole 36 corresponds to the opening area 918, allowing the focusing wheel 16 to protrude through the main housing 32 at the opening area 918. It can be understood that this design positions the focusing wheel 16 in a relatively concealed location, making it less prone to accidental touch and enhancing the user experience.

The above-described embodiments merely illustrate several embodiments of the present disclosure, and the description thereof is relatively specific and detailed, but it should not be construed as limiting the scope of patent protection. It should be pointed out that, for ordinary skilled in the art, several modifications and improvements can be made without departing from the concept of the present disclosure, which all fall within the scope of protection of the present disclosure. Therefore, the protection scope of the present disclosure should be determined by appended claims.

What is claimed is:

1. An ambient image projection device, comprising
a lens assembly;
a projection assembly; wherein the projection assembly comprises a first light source and a display screen; and
a distortion lens assembly configured to receive image light from the lens assembly, to expand a projection range of the image light, and to induce distortion in a portion of the image light at edge regions of the image light;
wherein content displayed on the display screen forms dynamic images to be projected into space under guidance of the lens assembly; and
the first light source, the display screen, and the lens assembly are arranged along an optical path direction of the projection assembly, and the display screen is arranged on a light-emitting side of the first light source and is coaxially arranged with the first light source;
wherein the distortion lens assembly comprises a convex lens arranged adjacent to the lens assembly and a concave lens arranged on a side of the convex lens opposite to the lens assembly, wherein a surface of the convex lens facing the lens assembly is convex, a surface of the convex lens opposite to the lens assembly is flat, the concave lens is a biconcave lens, a concave curvature on the light-receiving side of the second concave lens is greater than that on the light-emitting side, and a diameter of a projected pattern along an optical axis of the second concave lens on the light-receiving side is smaller than that on the light-emitting side.

2. The ambient image projection device according to claim 1, wherein the projection assembly further comprises a light-converging member arranged between the first light source and the display screen, wherein the light-converging member comprises a light inlet and a light outlet, the first light source corresponds the light inlet, the display screen receives light through the light outlet, the light-converging member comprises a sidewall, and an inner diameter of at least part of the sidewall increases gradually in a direction from the light inlet to the light outlet.

3. The ambient image projection device according to claim 2, wherein a cross-section of the sidewall in an optical path direction of the light-converging member is in a preset shape, and a shape of the display screen matches the preset shape.

4. The ambient image projection device according to claim 2, wherein light emitted by the first light source enters the light-converging member from the light inlet.

5. The ambient image projection device according to claim 2, wherein
the projection assembly further comprises:
a first lens arranged between the light-converging member and the display screen; and
a second lens arranged between the display screen and the lens assembly.

6. The ambient image projection device according to claim 5, wherein both the first lens and the second lens are Fresnel lens.

7. The ambient image projection device according to claim 5, wherein
The projection assembly further comprises a reflective mirror arranged between the second lens and the lens assembly, and the reflective mirror is at an angle to the display screen.

8. The ambient image projection device according to claim 1, wherein
the lens assembly comprises a first convex lens, a first concave lens, and a second convex lens, the first convex lens is arranged adjacent to a side of the display screen and protruding towards the display screen, and the second convex lens is arranged on a side of the first concave lens opposite to the first convex lens and protrudes away from the first concave lens.

9. The ambient image projection device according to claim 1, further comprising:
a speaker; and
a controller, wherein the controller is in a communication connection with the display screen, the speaker, and the projection assembly, and the controller is configured to provide video signals to the display screen and to provide audio signals to the speaker.

10. An ambient image projection device, comprising
a lens assembly;
a projection assembly; wherein the projection assembly comprises a first light source and a display screen; and
a distortion lens assembly configured to receive image light from the lens assembly, to expand a projection range of the image light, and to induce distortion in a portion of the image light at edge regions of the image light;
wherein content displayed on the display screen forms dynamic images to be projected into space under guidance of the lens assembly; and
the first light source, the display screen, and the lens assembly are arranged along an optical path direction of the projection assembly, and the display screen is arranged on a light-emitting side of the first light source and is coaxially arranged with the first light source;
wherein the distortion lens assembly comprises a convex lens arranged adjacent to the lens assembly and a concave lens arranged on a side of the convex lens opposite to the lens assembly, wherein a surface of the convex lens facing the lens assembly is convex, a surface of the convex lens opposite to the lens assembly is flat, the concave lens is a biconcave lens; a maximum thickness of the convex lens ranges between 6.2 mm and 10.2 mm, and a concave surface of the concave lens facing the convex lens and an optical center of the convex lens ranges from 11.7 mm to 21.7 mm.

11. An ambient image projection device, comprising
a lens assembly;

a projection assembly; wherein the projection assembly comprises a first light source and a display screen;

wherein content displayed on the display screen forms dynamic images to be projected into space under guidance of the lens assembly; and the first light source, the display screen, and the lens assembly are arranged along an optical path direction of the projection assembly, and the display screen is arranged on a light-emitting side of the first light source and is coaxially arranged with the first light source;

wherein the ambient image projection device further comprises:

an optical module housing, wherein the projection assembly, and the lens assembly are arranged in the optical module housing, the optical housing comprises at least one air inlet; and a first heat-dissipation fan arranged on a side of the projection assembly opposite to the at least one air inlet and configured to allow air from the at least one air inlet to be drawn through gaps between two adjacent components of the projection assembly to take away heat from the projection assembly.

12. The ambient image projection device according to claim 11, wherein the optical module housing comprises a first part and a second part connected sequentially along the optical path direction, the projection assembly is arranged in the first part, while the lens assembly and the distortion lens assembly are arranged in the second part;

the first part has multiple first mounting slots, each of the first lens, the display screen, and the second lens is arranged in a corresponding one of the multiple first mounting slots, one of the multiple mounting slots adjacent to the first heat-dissipation fan is provided with dust-proof oil; part of the first part where the light-converging member is arranged is in a shape matching with a shape of the light-converging member;

the display screen is in a substantially rectangular shape, a cross-section of the light-converging member along a direction perpendicular to the optical path direction is rectangular;

the first part comprises a first section, a second section, and a third section connected sequentially along the optical path direction, a diameter of the first section gradually decreases along the optical path direction, a diameter of the second section is greater than that of the first section and the third section, and the second section defines focusing wheel protrusion holes for exposing a focusing wheel, the lens assembly is positioned on the focusing wheel; and the distortion lens assembly and the optical module housing are equipped with alignment and mating structures configured to align and connect the distortion lens assembly and the optical module together.

13. The ambient image projection device according to claim 11, wherein:

a heat-insulating glass is arranged between the first lens and the display screen;

the at least one air inlet comprises a first air inlet corresponding to a gap between the heat-insulating glass and the first lens and a second air inlet corresponding to the light-converging member;

a dust-proof air intake membrane is provided at the at least one air inlet;

a heat-dissipation member is arranged on a side of the first light source opposite to the light-converging member, the first head dissipation fan is further configured to blow air towards the heat-dissipation member to take away heat from the heat-dissipation member; the heat-dissipation member comprises a heat dissipation substrate that fixes the first light source and multiple cooling fins connected to the side of the heat dissipation substrate opposite to the first light source; the multiple cooling fins extend to a fan air outlet of the first heat-dissipation fan to allow air out from the first heat-dissipation fan is blown to gaps among the multiple colling fins to take away heat from the heat-dissipation member;

the first heat-dissipation fan comprises a fan housing with an installation cavity and fan blades arranged within the installation cavity, the fan housing has a fan air inlet facing the projection assembly and the fan air outlet, at least one air guide vane is arranged at the fan air outlet; and the fan housing is snap-fitted onto the optical module housing.

14. The ambient image projection device according to claim 11, wherein at least lens barrel is arranged at a front end of optical module housing; the lens assembly is arranged in the at least one lens barrel; the at least one lens barrel comprises a fixed lens barrel and a movable lens barrel, a focusing wheel is sleeved on an exterior of the movable lens barrel; an outer surface of the movable lens barrel is provided with external threads, while an inner surface of the focusing wheel is provided with internal threads that match the external threads so that movement of the focusing wheel is capable of driving the movable lens barrel to bring the lens assembly to move in the optical path direction for focusing;

the front end of the optical module housing is provided with focusing wheel protruding holes configured to allow at least part of the focusing wheel to protrude therethrough to an exterior of the optical module housing for rotation operation;

a front end of the focusing wheel is provided with a limiting structure, when the movable lens barrel moves to the limiting structure, a front end of the movable lens barrel resists against the limiting structure while a distance remains between the lens assembly and the distortion lens assembly;

an engagement groove matching the fixed lens barrel is provided inside the front end of the optical module housing, and the fixed lens barrel is configured to be positioned, engaged, and fixed within the engagement groove; and a first positioning structure is arranged on an outer surface of the fixed lens barrel, and a second positioning structure is arranged at the front end of the optical module housing corresponding to the first positioning structure, one of the first positioning structure and the second positioning structure is a positioning hole, another of the first positioning structure and the second positioning structure is a positioning post.

15. The ambient image projection device according to claim 14, further comprising an outer housing, the optical module housing is arranged in the outer housing, the outer housing comprises a main housing and a base, the main housing is movably mounted on the base, the ambient image projection device is arranged in the main housing, the main housing is equipped with a projection aperture corresponding to the distorted lens assembly.

16. The ambient image projection device according to claim 15, wherein the main housing is equipped with a focusing aperture through which the focusing wheel protrudes out of the main housing; and two opposite sides of the main housing are provided with first sliding structures; sidewalls extend from both sides of the base and an inner side of the sidewalls is provided with second sliding structures, cooperation of the first sliding structures and the second sliding structures enables the main housing to bring the ambient image projection device to slide relative to the base so as to adjust a position of a preset ambient imaging scene of the ambient image projection device.

17. The ambient image projection device according to claim 16, wherein the main housing is circular, the first sliding structures are arranged along edges of top and bottom surfaces of the main housing to form arc-shaped sliding grooves; the second sliding structures comprises arc-shaped sliding blocks arranged on the sidewalls of the base; and the base is provided with damping pads attached to a bottom of the main housing.

18. An ambient image projection device, comprising a lens assembly; and a projection assembly; wherein the projection assembly comprises a first light source and a display screen;

wherein content displayed on the display screen forms dynamic images to be projected into space under guidance of the lens assembly; and the first light source, the display screen, and the lens assembly are arranged along an optical path direction of the projection assembly, and the display screen is arranged on a light-emitting side of the first light source and is coaxially arranged with the first light source;

wherein a projection ratio of the ambient image projection device is less than or equal to 0.9, the projection ratio is a ratio of a projection distance to a width of a projected image, and the projection distance is a straight-line distance from a light-emitting side of the ambient image projection device to the projected image.

* * * * *